(12) United States Patent
Edmonds et al.

(10) Patent No.: US 9,850,405 B2
(45) Date of Patent: Dec. 26, 2017

(54) ARTICLE COMPRISING POLYACRYLATE PRESSURE SENSITIVE PRIMER AND ADHESIVE COMPRISING POLYACRYLATE COMPONENT

(71) Applicant: 3M INNOVATIVE PROPERTIES COMPANY, St. Paul, MN (US)

(72) Inventors: William F. Edmonds, Minneapolis, MN (US); Jason S. Petaja, Cottage Grove, MN (US); Jeffrey L. Solomon, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/022,217

(22) PCT Filed: Sep. 30, 2014

(86) PCT No.: PCT/US2014/058280
§ 371 (c)(1),
(2) Date: Mar. 16, 2016

(87) PCT Pub. No.: WO2015/050862
PCT Pub. Date: Apr. 9, 2015

(65) Prior Publication Data
US 2016/0230048 A1    Aug. 11, 2016

Related U.S. Application Data

(60) Provisional application No. 61/885,765, filed on Oct. 2, 2013.

(51) Int. Cl.
*C09J 7/02*        (2006.01)
*F21V 8/00*        (2006.01)
(Continued)

(52) U.S. Cl.
CPC .......... *C09J 7/0217* (2013.01); *C09J 133/08* (2013.01); *C09J 2201/16* (2013.01);
(Continued)

(58) Field of Classification Search
CPC .... C09J 7/0217; C09J 133/08; C09J 2201/16; C09J 2201/606; C09J 2433/003; C09J 2433/00; C09J 2463/00; C09J 2477/003
See application file for complete search history.

(56) References Cited

U.S. PATENT DOCUMENTS 3,008,850 A * 11/1961 Ulrich ................... C09J 7/0246
28/156
5,086,086 A    2/1992 Brown-Wensley
(Continued)

FOREIGN PATENT DOCUMENTS

EP      1962111     8/2008
JP      2002-31705  1/2002
(Continued)

OTHER PUBLICATIONS

International Search Report for PCT International Application No. PCT/US2014/058280 dated Dec. 15, 2014, 5 pages.

*Primary Examiner* — Patricia L Nordmeyer
(74) *Attorney, Agent, or Firm* — Jeffrey M. Olofson

(57) ABSTRACT

An article is described comprising a substrate, a pressure sensitive polyacrylate primer layer disposed on the substrate, and an adhesive layer disposed onto the primer layer; wherein the adhesive layer comprises a polyacrylate component. The adhesive layer is typically further bonded to a second substrate or a release liner. In some embodiments, at least one substrate further comprises a microstructured surface layer and the primer layer is bonded to the microstructured surface layer. In other embodiments, the adhesive layer is further bonded to a (e.g. post) structure. In some embodiments, the articles are optical films or optical film stacks.

(Continued)

Methods of making an (e.g. adhesive coated) article are also described.

20 Claims, 10 Drawing Sheets

(51) Int. Cl.
*C09J 163/00* (2006.01)
*C09J 133/08* (2006.01)

(52) U.S. Cl.
CPC ...... *C09J 2201/606* (2013.01); *C09J 2433/00* (2013.01); *C09J 2433/003* (2013.01); *C09J 2463/00* (2013.01); *C09J 2477/003* (2013.01)

(56) References Cited

U.S. PATENT DOCUMENTS

| | | | |
|---|---|---|---|
| 5,175,030 A | 12/1992 | Lu | |
| 5,183,597 A | 2/1993 | Lu | |
| 5,252,694 A | 10/1993 | Willett | |
| 5,602,202 A | 2/1997 | Groves | |
| 5,677,376 A | 10/1997 | Groves | |
| 5,820,957 A | 10/1998 | Schroeder | |
| 5,897,727 A | 4/1999 | Staral | |
| 5,998,495 A | 12/1999 | Oxman | |
| 6,180,200 B1 | 1/2001 | Ha | |
| 6,376,590 B2 | 4/2002 | Kolb | |
| 6,730,397 B2 | 5/2004 | Melancon | |
| 6,778,240 B2 | 8/2004 | Nakmura | |
| 6,842,288 B1 | 1/2005 | Liu | |
| 7,241,437 B2 | 7/2007 | Davidson | |
| 7,282,272 B2 | 10/2007 | Jones | |
| 7,328,638 B2 | 2/2008 | Gardiner | |
| 7,350,442 B2 | 4/2008 | Ehnes | |
| 7,526,164 B2 | 4/2009 | Ouderkirk | |
| 7,599,592 B2 | 10/2009 | Benson, Jr. | |
| 8,263,863 B2 | 9/2012 | Young | |
| 2006/0027321 A1 | 2/2006 | Schaffer | |
| 2006/0029784 A1 | 2/2006 | Doan | |
| 2007/0286994 A1 | 12/2007 | Walker | |
| 2007/0298193 A1 | 12/2007 | Nakamura | |
| 2008/0221291 A1 | 9/2008 | Invie | |
| 2009/0017256 A1 | 1/2009 | Hunt | |
| 2009/0041553 A1 | 2/2009 | Burke | |
| 2012/0113622 A1 | 5/2012 | Aronson | |
| 2012/0154811 A1 | 6/2012 | Pokorny | |
| 2013/0004728 A1 | 1/2013 | Boyd | |
| 2014/0016208 A1 | 1/2014 | Edmonds | |

FOREIGN PATENT DOCUMENTS

| | | |
|---|---|---|
| JP | 2005-156615 | 6/2005 |
| JP | 2006-113561 | 4/2006 |
| WO | WO 1998-12596 | 3/1998 |
| WO | WO 2000-048037 | 8/2000 |
| WO | WO 2004-104679 | 12/2004 |
| WO | WO 2008-112451 | 9/2008 |
| WO | WO 2009-079275 | 6/2009 |
| WO | WO 2010-074862 | 7/2010 |
| WO | WO 2010-141261 | 12/2010 |
| WO | WO 2010-141345 | 12/2010 |
| WO | WO 2011-028373 | 3/2011 |
| WO | WO 2011-056475 | 5/2011 |
| WO | WO 2011-130144 | 10/2011 |
| WO | WO 2011-130151 | 10/2011 |
| WO | WO 2011-130155 | 10/2011 |
| WO | WO 2011-140018 | 11/2011 |
| WO | WO 2012-074814 | 6/2012 |
| WO | WO 2012-138495 | 10/2012 |
| WO | WO 2013-142084 | 9/2013 |
| WO | WO 2013-158475 | 10/2013 |
| WO | WO 2014-081693 | 5/2014 |
| WO | WO 2014-093014 | 6/2014 |
| WO | WO 2015-050750 | 4/2015 |
| WO | WO 2015-050751 | 4/2015 |

* cited by examiner

US 9,850,405 B2

ARTICLE COMPRISING POLYACRYLATE PRESSURE SENSITIVE PRIMER AND ADHESIVE COMPRISING POLYACRYLATE COMPONENT

CROSS REFERENCE TO RELATED APPLICATIONS

This application is a national stage filing under 35 U.S.C. 371 of PCT/US2014/058280, filed Sep. 30, 2014, which claims the benefit of U.S. Provisional Application No. 61/885,765, filed Oct. 2, 2013, the disclosure of which is incorporated by reference in its/their entirety herein.

SUMMARY

In one embodiment, an article is described comprising a substrate, a pressure sensitive polyacrylate primer layer disposed on the substrate, and an adhesive layer disposed onto the primer layer; wherein the adhesive layer comprises a polyacrylate component. The adhesive layer is typically further bonded to a second substrate or a release liner. In some embodiments, at least one substrate further comprises a microstructured surface layer and the primer layer is bonded to the microstructured surface layer. In other embodiments, the adhesive layer is further bonded to a (e.g. post) structure. In some embodiments, the articles are optical films or optical film stacks.

In another embodiment, a method of making an (e.g. adhesive coated) article is described comprising coating a substrate with a primer layer, the primer layer comprising a polyacrylate pressure sensitive adhesive; and disposing an adhesive layer onto the primer layer wherein the adhesive composition comprises a polyacrylate component.

DETAILED DESCRIPTION OF PREFERRED EMBODIMENTS

Figure 1:
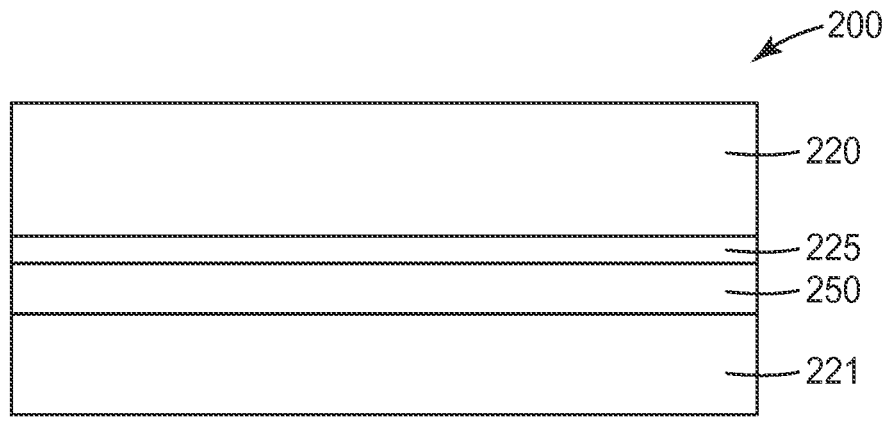
FIG. 1 is a cross-sectional view of a first substrate, a primer layer, an adhesive layer, and a second substrate.

With reference to FIG. 1, the present invention generally relates to an article 200 comprising a substrate 220, a polyacrylate pressure sensitive primer layer 225 disposed on the substrate, and an adhesive layer 250 disposed on the primer layer. The adhesive layer comprises a polyacrylate component. The adhesive layer is typically further bonded to a (e.g. second) substrate 221 or a release liner (not shown) may be disposed on the adhesive layer 250 in place of substrate 221.

Figure 2:
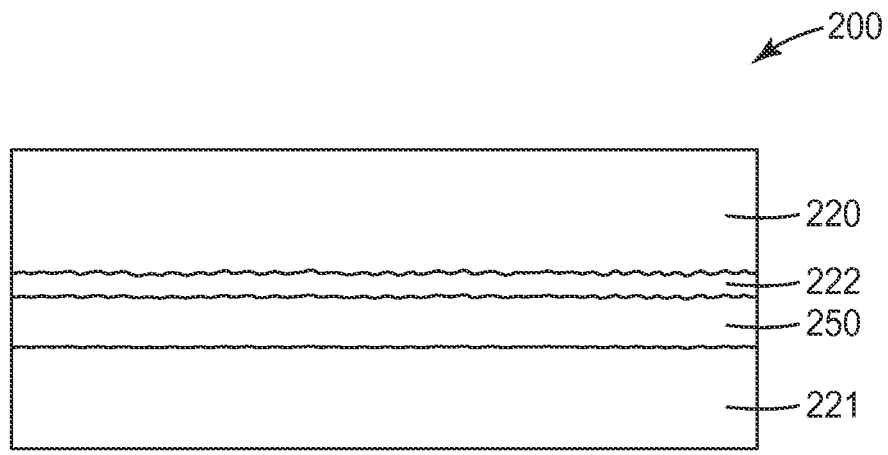
FIG. 2 is a cross-sectional view of a first substrate comprising a microstructured surface layer, a primer layer, an adhesive layer, and second substrate.

With reference to FIG. 2, in one embodiment, substrate 220 further comprises a microstructured (e.g. diffuser) layer 222. A polyacrylate pressure sensitive primer layer 225 is disposed on the microstructured (e.g. diffuser) layer, and an adhesive layer 250 disposed on the primer layer. The adhesive layer is typically further bonded to a (e.g. second) substrate 221 or a release liner (not shown) may be disposed on the adhesive layer 250 in place of substrate 221. Substrate 221 can be the same substrate or a different substrate than substrate 220.

In some embodiments, the second substrate comprises the microstructured (e.g. diffuser) layer 222. This naming convention was selected to be consistent with the naming convention utilized in WO 2012/138495. However, in other embodiments, the substrate that comprises the primer is the "first substrate". In this embodiment, the inclusion of a microstructured (e.g. diffuser) layer on the first or second substrate is optional.

For embodiments that include a microstructured (e.g. diffuser) layer on the first or second substrate, the surface of substrate 220 and/or 221 can be roughened or textured to provide a microstructured (e.g. diffuser) layer (e.g. 222). This can be accomplished in a variety of ways as known in the art including embossing the underlying layer(s) with a suitable tool that has been bead-blasted or otherwise roughened.

A microstructured (e.g. diffuser) layer 222 can also be prepared by applying a coating composition to substrate 220 and/or 221 comprising suitably sized particles such as silica sand, glass beads, or polymeric beads to the composition. The average particle size typically ranges from about 1 to 10 microns. The concentration of such particles may range from at least 2 wt-% to about 10 wt-% or greater of the microstructured (e.g. diffuser) layer 222. At concentrations of less than 2 wt-% (e.g. 1.8 wt-%, 1.6 wt-%, 1.4 wt-%, 1.2 wt-%, 1.0 wt-%, 0.8 wt-%, 0.6 wt-%, the concentration is typically insufficient to produce the desired reduction in gloss (which also contributes to an increase in haze).

In yet another embodiment, the microstructured (e.g. diffuser) layer (e.g. 222) can generally be fabricated using microreplication from a tool by casting and curing a polymerizable resin composition in contact with a tool surface such as described in U.S. Pat. No. 5,175,030 (Lu et al.) and U.S. Pat. No. 5,183,597 (Lu). The tool may be fabricated using any available fabrication method, such as by using engraving or diamond turning. Exemplary diamond turning systems and methods can include and utilize a fast tool servo (FTS) as described in WO2010/141345; incorporated herein by reference. Alternatively, the tool may be fabricated by electrodeposition. In one embodiment, the tool is prepared by forming a first layer of a metal by electrodepositing the metal using a first electroplating process resulting in a first major surface of the first layer having a first average roughness; and forming a second layer of the metal on the first major surface of the first layer by electrodepositing the metal on the first major surface using a second electroplating process resulting in a second major surface of the second layer having a second average roughness smaller than the first average roughness; as described in WO2014/081693; incorporated herein by reference When the microstructured (e.g. diffuser) layer is fabricated using microreplication from a tool by casting and curing a polymerizable resin composition in contact with a tool surface, the microstructured surface layer comprises a plurality of peaks and the majority (i.e. at least 50%) and typically substantially all the peaks are of free of (e.g. embedded) matte particles.

Substrate (220 and/or 221) will be chosen based in part on the desired (e.g. optical and mechanical) properties for the intended use. Such mechanical properties typically will include flexibility, dimensional stability and impact resistance. For most applications, the substrate thickness is at least 0.02 mm and no greater than of less than about 0.5 mm or 0.2 mm. The substrate can optionally be treated to improve adhesion e.g., chemical treatment, corona treatment such as air or nitrogen corona, plasma, flame, or actinic radiation. However, in some embodiments the substrate is free of such treatments to improve adhesion.

In favored embodiments, the substrate(s) is an optical film. In some embodiments, the "optical film" is light transmissive film in the optical path of the display that does not substantially alter at least one optical property as compared to viewing the display in the absence of the optical film. In this embodiment, the "optical film" is typically highly transparent, exhibiting a transmission of visible light (i.e. 400 to 700 nm) of at least 80%, 85%, or 90%. The transmission of an optical film can be measured with various known techniques. As used herein, the on-axis transmission was measured with an instrument commercially available from BYK Gardner under the trade designation "Haze-Guard Plus (catalog #4725)." A soil resistant film that typically comprises a low surface energy coating is an example of an optical film that does not substantially alter at least one optical property.

Optical films may be comprised of glass or ceramic materials. Optical films are commonly comprised of light transmissive polymeric materials including for example cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, cyclic olefin copolymers, polyethylene naphthalate, and copolymers or blends based on naphthalene dicarboxylic acids. Optionally, the optical film can contain suitable mixtures or combinations of these materials.

Figure 5A:
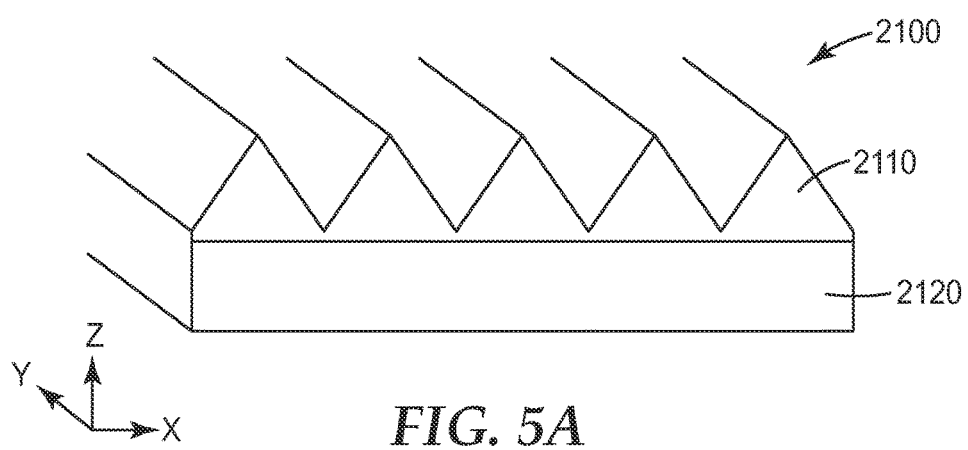
FIGS. 5A and 5B is a schematic three-dimensional view of a light directing film.
Figure 5B:
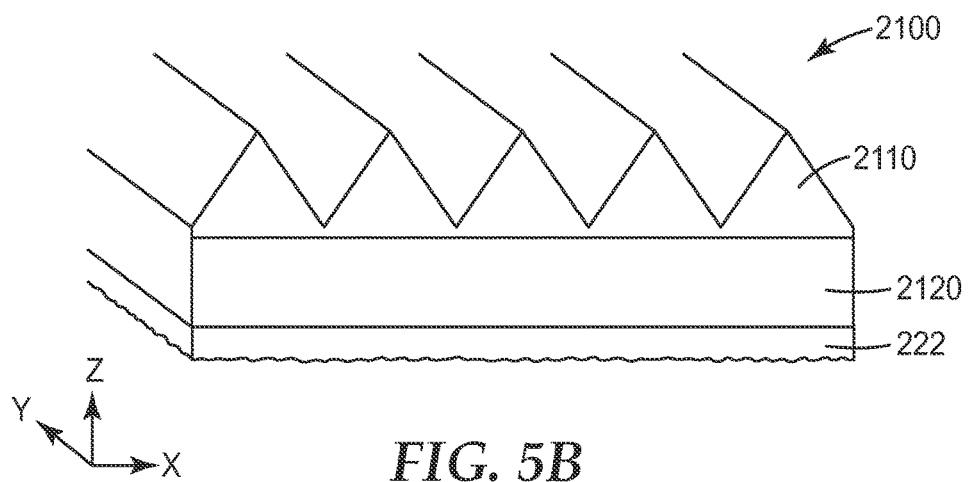
Figure 6:
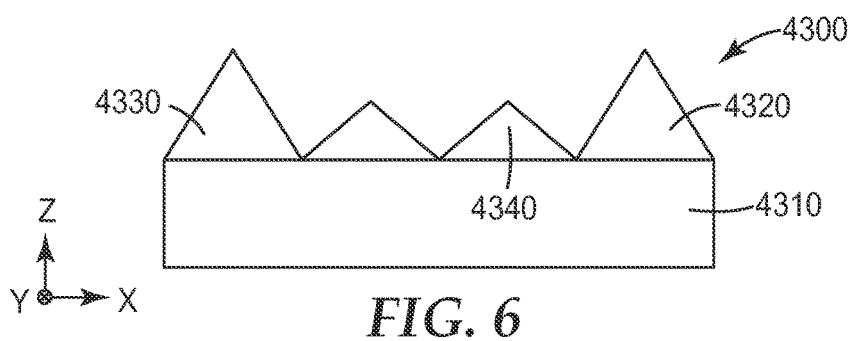
FIG. 6 is a schematic side-view of a light directing film.

In favored embodiments, "optical film" refers to a light transmissive film in the optical path of the display that substantially alters at least one optical property as compared to viewing the display in the absence of the optical film. Examples of such optical films include polarizing film, prism film such as brightness enhancing light directing film (such as depicted in FIGS. 5A, 5B, and 6), and diffuser films. Other optical film include matte or antiglare films, antireflective films, light-collimating films (also referred to as privacy filters), as well as certain films having a coating that reduces the visibility of fingerprints such as described in U.S. Publication No. 2012/0154811; incorporated herein by reference. Films that reduce the visibility of fingerprints exhibit a reduction in haze, a haze ratio of initial (simulated) fingerprint visibility to (simulated) fingerprint visibility at 20 minutes of less than 0.80, 0.70, 0.60, or 0.50.

In some embodiments, a single optical film may (e.g. concurrently) alter more than one optical property. For example, a brightness enhancing light directing film that comprises a microstructured (e.g. diffuser) layer (such as depicted in FIG. 5B) may concurrently improve brightness or "gain" and also function as a diffuser.

With reference to FIG. 5B, the microstructures of the microstructured (e.g. diffuser) layer 222 are different than the (e.g. prism) structures 2110 of the optical film. In one aspect, the microstructures of the microstructured (e.g. diffuser) layer 222 form an irregular pattern or a pseudo-random pattern that appears to be random. In contrast, the (e.g. prism) structures of the optical film generally have a nominally regular pattern. In another aspect, the microstructures of the microstructured (e.g. diffuser) layer 222 are typically smaller than the (e.g. prism) structures of the optical film. For example, the microstructures of the microstructured (e.g. diffuser) layer 222 typically have an average peak to valley height of no greater than 5 microns; whereas the (e.g. prism) structures typically have a peak to valley height of greater than 8, 9, or 10 microns. In some embodiments, the microstructured surface of the diffuser layer (including the primer and adhesive layer) can be characterized as having a surface roughness (Rz) ranging from 1.5 to 7.5 microns and/or a mean height ranging from 0.75 microns to 4 microns; as described in Application Ser. No. 61/885, 723, filed Oct. 2, 2013; incorporated herein by reference. In another aspect, the (e.g. prism) structures of the optical film have substantially the same slope (e.g. apex angle of about 90°); whereas the microstructured (e.g. diffuser) layer 222 has microstructures having different magnitudes of slope, referred to as a complement cumulative slope magnitude distribution $F_{cc}(\theta)$. In some embodiments, the microstructured diffuser has a slope magnitude distribution $F_{cc}(\theta)$ as described in previously cited Application Ser. No. 61/885, 723, filed Oct. 2, 2013. In many embodiments, a least 90% of the microstructures of the microstructured diffuser have a slope magnitude of less than 20 or 15 degrees.

For embodiments wherein the substrate is an optical film, the adhesive can be characterized as an optical adhesive, meaning it is optically transmissive, e.g., optically clear, in one or both of its uncured and cured state. Optical clarity allows the adhesive to be used in preparing optical elements. The adhesive can also maintain optical clarity, e.g., transmissivity, for a useful period of time under normal use conditions and as shown by accelerated aging tests. Preferred (e.g. uncured) optical adhesives can exhibit a luminous transmission of at least about 90%. Upon curing, optical clarity of the cured adhesive, as measured according to ASTM-D 1003-95, can be in the same range.

The adhesive (in the absence of suitable sized particles to increase haze) typically has a haze of less than about 2%, and an opacity of less than about 1%. However, suitable sized particles (as previously described for the microstructured surface layer) can be added to increase the haze to at least 2%, or 5%, or 10%. The haze is generally less than 50, 45 or 40% for most uses.

A cured adhesive layer comprising an interpenetration polymer network (IPN) is a favored adhesive composition for the adhesive layer of the bonded substrates (e.g. optical stacks) and intermediates. A favored adhesive composition comprises a polyacrylate and a polymerizable monomer wherein upon curing the adhesive forms an interpenetrating polymer network (IPN).

There are at least two types of interpenetrating polymer networks, those that do not react between components, and those that do react to form a chemical bond between different components (inter-reacted IPNs). Specifically, one form of IPN includes polyacrylate polymers and a polymerized monomer (e.g. epoxy or multi-(methacrylate)) that entangles the polymer chains into a network that is mechanically intertwined. The mechanical entanglement of the IPN adds strength and integrity to the adhesive and can prevent phase separation and loss of clarity. A second form of IPN according to the invention includes an inter-reacted interpenetrating polymer network, wherein the epoxy component is directly or indirectly chemically bonded to the polyacrylate component. Here, the polymerizable monomer contains reactive functional groups that can react directly or indirectly with the polyacrylate. As an example, an epoxy group is directly reactive with a hydroxy or acidic functionality of the polyacrylate component. Alternatively, the polyacrylate and epoxy components can be chemically bonded to an intermediate chemical component such as a di- or multi-functional polymer, crosslinker, macromer, or oligomer. The intermediate chemical component chemically connects the epoxy component to the polyacrylate, producing an IPN.

The primer layer and the adhesive layer both comprise a polyacrylate. Polymers prepared from at least 50 wt-% of one or more of such (meth)acrylate monomers will be referred to collectively as "polyacrylates." Acrylate and methacrylate monomers are referred to collectively herein as (meth)acrylate monomers. The polymers can be homopolymers or copolymers, optionally in combination with other, non-(meth)acrylate ethylenically unsaturated monomers such as vinyl-unsaturated, monomers. The polyacrylate is polymerized prior to being combined with the polymerizable monomer of the adhesive. The polyacrylate is typically polymerized prior to being combined with the nitrogen-containing polymer of the primer.

Specific examples of polyacrylate polymers useful according to the invention include those prepared from free-radically polymerizable acrylate monomers or oligomers such as described in U.S. Pat. No. 5,252,694 at col. 5, lines 35-68. While the invention can be accomplished with any variety of different (meth)acrylate monomers and polyacrylates, in a favored embodiment, the polyacrylate includes one or more reactive functional groups that can be reacted to connect the polyacrylate directly or indirectly to the epoxy component, i.e. for connecting the polyacrylate to the epoxy component to produce an interpenetrating polymer network. These reactive functional groups can be any known reactive groups, such as hydroxy (—OH) or acidic (e.g., carboxylic, —COOH) reactive groups. Such groups can be included in a polyacrylate, for example, by including an appropriate monomer in preparing the polyacrylate, such as an acrylic acid monomer. Alternatively, this inter-reaction between polyacrylate and epoxy can be achieved through the use of bi- or multi-functional monomers such as epoxy acrylates in conjunction with grafting groups that can react with the polyacrylate. Examples of useful monomers include specifically, but not exclusively, the following classes:

(i) acrylic acid esters of an alkyl alcohol (preferably a non-tertiary alcohol), the alcohol containing from 1 to 14 (preferably from 4 to 14) carbon atoms and include, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate;

(ii) methacrylic acid esters of an alkyl alcohol (preferably a non-tertiary alcohol), the alcohol containing from 1 to 14 (preferably from 4 to 14) carbon atoms and include, for example, methyl methacrylate, ethyl methacrylate, n-propyl methacrylate, n-butyl methacrylate, isobutyl methacrylate and t-butyl methacrylate;

(iii) (meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl (meth)acrylates.

The monomeric repeat units of the polyacrylate component of both the primer layer and the adhesive layer are generally chosen such that the polyacrylate component is a pressure sensitive adhesive.

The primer layer is a polyacrylate pressure sensitive adhesive. In some embodiments, the polyacrylate component of the adhesive is also a pressure sensitive adhesive.

Pressure sensitive adhesive (PSA) compositions are well known to those of ordinary skill in the art to possess properties including (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power. The modulus of the pressure sensitive adhesive primer at the application temperature, typically room temperature 25° C., is less than $3 \times 10^6$ dynes/cm at a frequency of 1 Hz. In some embodiments, the modulus of the pressure sensitive adhesive primer at the application temperature, typically room temperature (25° C.), is less than $2 \times 10^6$ dynes/cm or $1 \times 10^6$ dynes/cm at a frequency of 1 Hz.

Although the adhesive layer can comprise a polyacrylate pressure sensitive adhesive as a component, upon curing of the polymerizable component of the adhesive layer, the cured adhesive layer has a higher modulus than a pressure sensitive adhesive. Prior to curing, the polyacrylate component of the adhesive typically also has the same PSA modulus properties at 25° C. as just described for the primer.

The PSA properties of the polyacrylate are typically provided by inclusion of sufficient monomeric repeat units comprising C4-C12 alkyl groups. Such alkyl groups are typically branched. In some embodiments, the polyacrylate comprises isooctyl repeat units. In other embodiments, the polyacrylate comprises butyl and/or hexyl repeat units. In yet other embodiments, the polyacrylate comprises a combination of C4-C12 alkyl groups, such as hexyl and butyl. The amount (percentage by weight) of the C4-C12 alkyl monomeric repeat units can vary depending on the chain length of the C4-C12 alkyl group(s) present in the polyacrylate. In the case of isooctyl the concentration is typically at least 50 to 60 wt-% of the polyacrylate. However, when the C4-C12 alkyl group has a chain length greater than octyl, the concentration may be lower. Further, when the C4-C12 alkyl group has a chain length greater less than octyl, the concentration may be higher. Hence, the concentration of C4-C12 alkyl repeat units may range from about 40 to about 70 wt-% of the polyacrylate.

With regard to the total adhesive composition or cured adhesive layer that further comprises a copolymerizable monomer, the concentration of C4-C12 alkyl repeat units, such as isooctyl, typically ranges from about 15 to 50 wt-%.

The polyacrylate also typically comprises repeat units derived from acrylic acid. The concentration of repeat units derived from acrylic acid typically range from 0 to 15 wt-%. In one embodiment, the oxirane moieties of the epoxy monomer copolymerize with the acrylic acid moieties of the polyacrylate forming an inter-reacted interpenetrating polymer network.

By inclusion of sufficient polyacrylate, the uncured adhesive is typically sufficiently pressure sensitive. This allows the uncured adhesive to conveniently and accurately be applied and positioned, e.g., between a substrate and a material (e.g. another substrate) to be bonded to the substrate. Subsequently, the curable adhesive can be cured to create a structural bond. In some embodiments, the cured adhesive no longer exhibits pressure sensitive adhesive properties after the adhesive has been cured.

The adhesive composition or cured adhesive layer typically comprises at least 35 or 40 wt-% of polyacrylate.

Further, the concentration of polyacrylate is generally no greater than 70 wt-% or 75 wt-% when an epoxy is utilized as the polymerizable monomer of the adhesive layer. However, when a multi-(meth)acrylate is utilized as the polymerizable monomer of the adhesive layer, the cured adhesive layer can comprises 80, 85, 90, 95 and even 100% polyacrylate. When the adhesive composition or cured adhesive layer comprises filler, such concentrations refer to the unfilled portion of the adhesive composition or cured adhesive layer.

The concentration of polyacrylate pressure sensitive adhesive in the primer layer is generally at least 75, 80, 85, 90, 95 or greater polyacrylate. The primer may only contain polyacrylate and the nitrogen-containing polymer at the exclusion of other organic or inorganic components.

The adhesive composition comprises at least one polymerizable monomer. In some embodiments, a single monomer is utilized. In other embodiments, a mixture of monomers is employed. The monomer or mixture of monomer is typically a liquid at ambient temperature (e.g. 25° C.); whereas the polyacrylate component is a solid at ambient temperature. The monomer(s) are chosen such that the polyacrylate dissolves in monomer. Thus, one function of the polymerizable monomer is to serve as a reactive diluent for the polyacrylate. Without intending to be bound by theory, dilution of the polyacrylate prior to curing (temporary) decreases the modulus of the polyacrylate, which is amenable to the unitary structures partially penetrating the adhesive layer.

The concentration of polymerizable monomer in the uncured adhesive (or polymerized monomer of the cured adhesive) is typically at least 20 wt-% or 25 wt-%. Further, the concentration of polymerizable monomer is typically no greater than 60 wt-% or 65 wt-%.

In a favored embodiment, the polymerizable monomer comprises functional groups (such as epoxy or (meth)acrylate groups). The molecular weight of the polymerizable monomer is typically less than 150 g/mole per cationically polymerizable group, and preferably less than 145 g/mole or 140 g/mole per functional group. In some embodiments, the molecular weight of the polymerizable monomer divided by the number of cationically polymerizable groups is at least 110 g/mole, 115 g/mole, or 120 g/mole. The molecular weight of the polymerizable monomer per functional group is typically at least 90 g/mole.

Suitable epoxy materials for use according to the invention will also be recognized by those of skill in the chemical and adhesive and structural adhesive arts. Such epoxy materials include cationically-polymerizable monomers, a large variety of which are well known in the chemical and adhesive arts. General examples of useful epoxy component include epoxy monomers and macromers, as well as multifunctional epoxy crosslinkers. In some embodiments, the epoxy monomers or macromers are aliphatic and may include cyclic aliphatic groups. In other embodiments, the epoxy monomers or macromers comprise aromatic groups. Bisphenol F and especially bisphenol A epoxies are commercially available from several suppliers.

In one embodiment, the polymerizable monomer of the adhesive is a (e.g. cyclo)aliphatic epoxy monomer, such as commercially available from Cytec Industries (Woodland Park N.J.) under the trade designation "Uvacure 1500".

In another embodiment, the polymerizable monomer of the adhesive is a glycol epoxy monomer, such as commercially available from Dow Chemical, under the trade designation, "D.E.R. 736".

In other embodiments, the adhesive composition comprises a polyacrylate (e.g. PSA polymer) and a multi-(meth)acrylate polymerizable monomer. In this embodiment, the adhesive composition typically comprises a free-radical initiator for curing multi-(meth)acrylate.

Multi-(meth)acrylates comprise at least two polymerizable (meth)acrylate groups including di-, tri-, etc., functional (meth) acrylate compounds. However, (meth)acrylate monomers having at least three (meth) acrylate group (commonly referred to as crosslinkers) are preferred to obtain the favored molecular weight of less than 150 g/mole per functional (e.g. (meth)acrylate) group, as previously described. Examples of preferred crosslinkers include trimethylolpropane triacrylate (TMPTA), pentaerythritol tri (meth)acrylate, pentaerythritol tetra(meth)acrylate, dipentaerythritol penta(meth)acrylate, dipentaerythritol hexa (meth)acrylate, trimethylolpropane ethoxylate tri(meth) acrylate, glyceryl tri(meth)acrylate, pentaerythritol propoxylate tri(meth)acrylate, and ditrimethylolpropane tetra(meth)acrylate. Any one or combination of crosslinking agents may be employed.

At least one initiator is included in the adhesive to cure the adhesive. Typical amounts of initiator can range from about 0.1 to about 5 parts by weight, about 0.5 to about 3 parts by weight of the total adhesive composition being preferred.

Useful cationic photoinitiators include any of a variety of known useful materials for curing epoxies, including examples such as onium salts and certain organometallic complexes. The description of exemplary organometallic complexes as well as their use with a number of epoxies and acrylates, can be found, for example, in U.S. Pat. Nos. 5,252,694, 5,897,727, and 6,180,200, the entire disclosures of which are incorporated herein by reference.

Exemplary onium salts have been described as having the structure AX wherein: A can be an organic cation, e.g., selected from diazonium, iodonium, and sulfonium cations, preferably selected from diphenyliodonium, triphenylsulfonium and phenylthiophenyl diphenylsulfonium; and X is an anion, the counterion of the onium salts including those in which X is organic sulfonate, or halogenated metal or metalloid.

Particularly useful onium salts include, but are not limited to, aryl diazonium salts, diaryl iodonium salts, and triaryl sulfonium salts. Additional examples of the onium salts are described in U.S. Pat. No. 5,086,086, col. 4, lines 29-61, the entire disclosure of which is incorporated herein by reference.

Free-radical photoinitiators useful for polymerizing a polyacrylate in combination with grafting agents and/or epoxy-acrylates, or multifunctional acrylate crosslinkers include the benzoin ethers, such as benzoin methyl ether or benzoin isopropyl ether, substituted benzoin ethers, such as anisoin methyl ether, substituted acetophenones, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene-sulfonyl chloride, and photoactive oximes, such as 1-phenyl-1,2-propanedione-2(O-ethoxycarbonyl)-oxime. In some embodiments, the free radical photoinitiator is a phosphine oxides, such as 2,4,6-trimethylbenzoyldiphenylphosphine oxide and bis(2,4,6-trimethylbenzoyl)-phenylphosphine oxide.

Photosensitizers can be employed in the curable adhesive composition. Photosensitizers can be used to alter the wavelength sensitivity of a photoinitiator. Representative examples of photosensitizers include anthracene, benzophenone, perylene, phenothiazine, xanthone, thioxanthone, acetophenone, fluorenone, anthraquinone, 9-methylanthracene, 2-ethyl-9,10-dimethoxyanthracene, 9,10-diethoxyanthracene, camphorquinone, and 1,3-diphenylisobenzofuran.

Other materials that can be included in the curable adhesive include mono- and polyols, tackifiers, reinforcing agents, and other modifiers, some of which may copolymerize with the free-radically or cationically polymerizable monomers, oligomers, or polymers, or polymerize independently. When present such optical materials are typically utilized in no greater than 5 wt-% or 10 wt-%. In favored embodiments, the adhesive is free of tackifiers and plasticizers that are liquids at ambient temperature, since the inclusion of such can lower the elastic modulus and/or increase creep upon aging.

In some embodiments, the cured adhesive composition can be characterized by use of dynamic mechanical analysis. The elastic modulus of the cured adhesive is typically at least 100 MPa. In some embodiments, the elastic modulus, is at least 200 MPa, or 300 MPa, or 400 MPa, or 500 MPa. The elastic modulus is typically no greater than 2000 MPa. The elastic modulus (E') at 25° C. is surmised related, at least in part, to the retained brightness and/or penetration with aging.

In some embodiments, the average toughness at 25° C. and a strain rate of 3%/min is typically at least 1 MJ/m$^3$. In some embodiments, the average toughness is at least 2, or 3, or 4, or 5 MJ/m$^3$. The average toughness is typically no greater than 15 MJ/m$^3$.

In some embodiments, the elongation of the cured adhesive composition is surmised related, at least in part, to the peel strength. In some embodiments, the average elongation at break at 25° C. and a strain rate of 3%/min is at least 15% or 20% and in some embodiments, at least 25%, 50%, or at least about 100%. The average elongation at break is typically no greater than 300%.

In order to obtain a thin adhesive layer, adhesive coating composition typically comprises solvent (i.e. not a reactive diluent) in an amount ranging from 85% to 97%. Representative solvents preferably organic, include acetone, methylethyl-ketone, ethyl acetate, heptane, toluene, cyclopentanone, methyl cellosolve acetate, methylene chloride, nitromethane, methyl formate, gamma-butyrolactone, propylene carbonate, and 1,2-dimethoxyethane (glyme). In a typical process, solvent is removed via drying to yield a thin adhesive.

The curable adhesive compositions can be prepared by conventional methods of combining the polyacrylate component, (e.g. epoxy) polymerizable monomer, etc. See, for example, U.S. Pat. No. 5,252,694 and U.S. Pat. No. 6,180,200.

The method of making the (e.g. optical stack) article or intermediate generally comprises disposing a primer layer onto a substrate by direct coating and disposing (preferably by direct coating) the adhesive layer onto the primer layer. Alternatively, in some embodiments, the adhesive may be first applied to a release liner, which is then contacted with the primer layer. The release liner may thereafter be stripped away to expose a major surface (e.g. 2061 of FIGS. 7A and 7B) of optical adhesive layer 2060 that can, for example, be bonded to another (e.g. optical film) substrate or surface. The release force for releasing the optical adhesive layer from a release liner is generally less than about 50 g-force/inch.

The primer and curable adhesive compositions may be applied by any conventional application method, including but not limited to gravure coating, curtain coating, slot coating, spin coating, screen coating, transfer coating, brush or roller coating, and the like. In some embodiments, the primer layer has an optical thickness of ¼ wave or a multiple of a ¼ wave (e.g. ½ wave, ¾ wave). In this embodiment, the combination of second optical substrate and the primer layer or the combination of the microstructured surface layer and the primer layer may provide antireflection. In typical embodiments, the (i.e. dried) primer layer and (i.e. dried) adhesive layer independently have a thickness of at least 0.5, 0.6, 0.7, 0.8, 0.9, or 1 micron. In some embodiments, the (i.e. dried) primer layer and (i.e. dried) adhesive layer independently have a thickness of at least 1.5, 2, 2.5, 3, 3.5, 4, 4.5, or 5 microns. The (i.e. dried) adhesive layer typically has a thickness greater than the primer. In some embodiments, the combination of the (i.e. dried) primer and adhesive layer is no greater than about 20, 15, or 10 microns.

Once the optical stack has been assembled, the adhesive is cured, typically by photocuring. Irradiation sources that provide light in the region from 200 to 800 nm are effective for curing the adhesive according to the invention. The primer may optionally be cured concurrently with the adhesive. A preferred region is between 250 to 700 nm. Suitable sources of radiation include mercury vapor discharge lamps, carbon arcs, quartz halogen lamps, tungsten lamps, xenon lamps, fluorescent lamps, lasers, sunlight, etc. The required amount of exposure to effect polymerization can depend on factors such as the identity and concentrations of particular free radically and cationically polymerizable monomers, the thickness of the exposed material, type of substrate, intensity of the radiation source and amount of heat associated with the radiation.

Figure 7A:
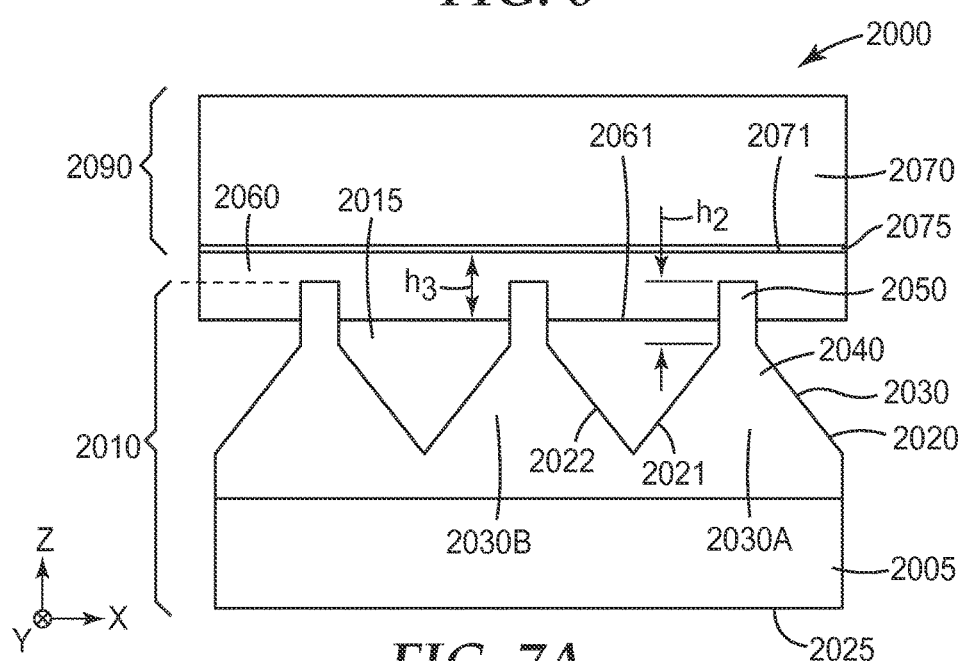
FIGS. 7A and 7B is a schematic side-view of an optical stack.
Figure 7B:
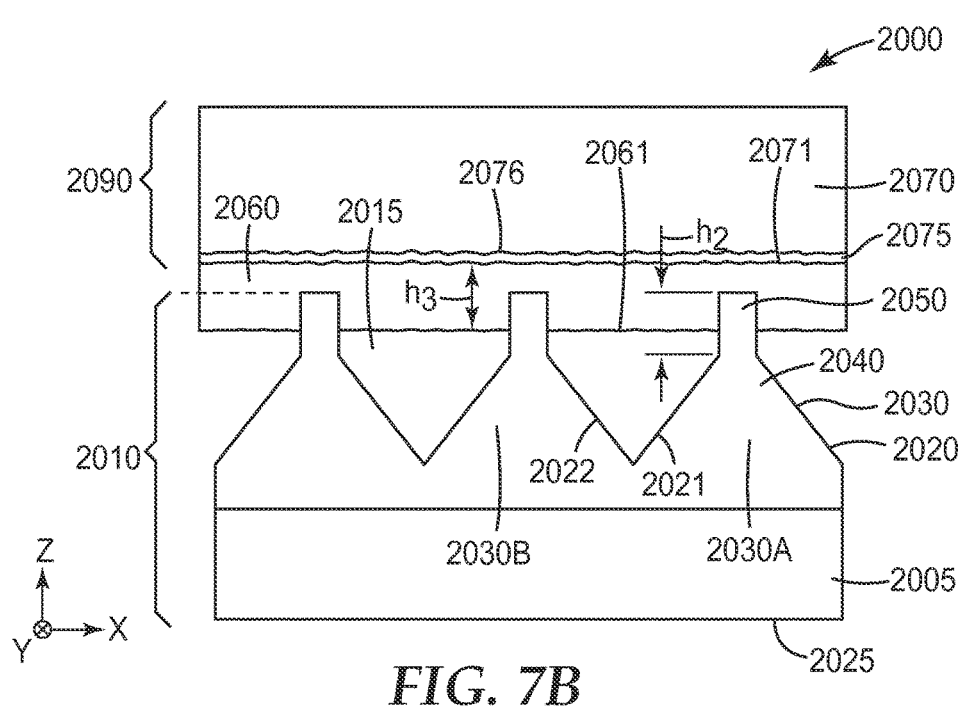

In one method of making an optical construction, the method comprises applying a primer layer and adhesive composition to a (e.g. microstructured surface of a) substrate; contacting the protruding structure with the substrate such that the structure partially penetrates the adhesive layer forming a separation between the adhesive layer and the first surface; and curing the adhesive. The separation is typically filled with air. With reference to FIGS. 7A and 7B, a substantial area of a plane that includes major surface 2061 of (e.g. optical) adhesive layer 2060 can be in contact with air, rather than a second substrate or (e.g. post) structure of a second substrate. In this embodiment, less than 50, 40, 30, 20, or 10% of the total surface area of major surface 2061 of (e.g. optical) adhesive layer 2060 can be in contact with a second substrate or (e.g. post) structure of a second substrate.

In other embodiments, the pressure sensitive polyacrylate primer can improve adhesion to difficult to bond substrates (e.g. lacking structures or a microstructures surface) such as PEN.

In some embodiments, the primer layer 225 optionally comprises a minor amount of a nitrogen-containing polymer dispersed in a polyacrylate (e.g. pressure sensitive) adhesive.

A variety of nitrogen-containing polymers can be employed in the adhesive composition. Nitrogen-containing polymers include homopolymers and copolymers that comprise a nitrogen atom having a free (i.e. unbonded) electron pair alone or in combination with an adjacent double-bonded oxygen atom.

Without intending to be bound by theory, in some embodiments, it is surmised that the nitrogen-containing polymer can prevent polymerization of a cationically polymerizable monomer present in the adhesive composition at the primer interface. This in turn creates an adhesive layer having a gradient of properties wherein the adhesive has a lower modulus and is increasingly pressure-sensitive at the primer interface. The adhesive increases in hardness in the direction of the opposing adhesive layer interface that contacts the (e.g. prism or post structures of the) first substrate.

The primer layer can optionally comprise one or more nitrogen-containing polymers in an amount of at least about 0.5, 1.0, 2 wt-% (i.e. solids) of the primer composition and typically no greater than about 10, 9, 8, 7, 6, or 5 wt-%. When the polymer is a copolymer, even higher concentrations may be utilized. For example a copolymer having a 1:1 weight ratio of a nitrogen-containing monomer and a second comonomer lacking the previously described nitrogen atom would typically be utilized at twice the concentration as compared to the nitrogen-containing polymer thereof.

Nitrogen-containing polymers have a weight average molecular weight (Mw) greater than the monomeric species from which such polymer was prepared. Exemplary nitrogen-containing monomers include for example n-vinyl containing monomers such as vinyl-caprolactam and vinylpyrrolidone, (meth)acrylates monomers containing (e.g. pendant) nitrogen-containing moieties such as N,N-dimethylaminoethyl acrylate, as well as acrylonitrile. Ethyloxazoline is yet another nitrogen-containing monomer. Suitable nitrogen-containing monomers (optionally in combination with comonomers) may be polymerized (e.g. in-situ) prior to adding the polyacrylate and any other optional ingredients of the primer composition.

Various nitrogen-containing polymers are commercially available from several sources. For example, copolymers of vinylpyrrolidone (PVP) and vinyl acetate (VA) are commercially available from International Specialties Products (Wayne, N.J.) under the trade designation "PVPNA" as well as from BASF (Mount Olive, N.J.) under the trade designations "Luviskol Va." and "Kollidon". Poly(vinylcaprolactam) homopolymers are commercially available from BASF under the trade designation "Luviskol Plus". Further, a terpolymer of vinylpyrrolidone, vinylcaprolactam, and dimethylaminoethyl methacrylate is commercially available from International Specialty Products, Texas City, Tex. under the trade designation "Advantage S". Linear polymers of ethyloxazoline and substituted ethyloxazoline are also commercially available from International Specialty Products under the trade designation "Aquazol". Further, acrylonitrile-styrene copolymers and acrylonitrile-butadiene-styrene terpolymers are commercially available from Dow Chemicals, Midland, Mich. under the respective trade designation "Tyril" and "Magnum". In some embodiments, the nitrogen-containing polymer lacks polymerizable (e.g. ethylenically unsaturated) groups.

The nitrogen containing homopolymer or copolymer typically has a Mw of at least about 2,000 g/mole as measured for example with GPC with reference to polyethylene oxide standards. Often the Mw is at least 5000, 10000, 15000, or 20000 g/mole. Although the Mw may range up to about 1 million, typically the Mw is no greater than about 500,000 or 250,000 g/mole. The use of a nitrogen-containing polymer can advantageously result in lower residual monomer content. For example, the residual nitrogen-containing monomer content of the primer layer is typically less than 50 ppm, often less than 25 ppm, and preferably less than 10 ppm.

In some embodiments, particularly in the case of bonding optical films or other articles wherein the optical quality is of importance, when utilized the nitrogen-containing polymer is soluble in the polyacrylate primer composition. The nitrogen-containing polymer can be added to the polyacrylate (e.g. PSA) after the monomers of the adhesive have been polymerized. By "soluble" it is meant that the nitrogen-containing polymer dissolves in the polyacrylate component of the primer (inclusive of solvent) such that it forms an optically homogeneous transparent solution as can be detected by viewing the composition in a 3-inch diameter test tube. In addition to the primer compositions comprising soluble nitrogen-containing polymer(s) being homogeneous and transparent, such composition are also stable, meaning that the composition does not separate after 6 months or longer (e.g. 1-2 years) of storage at ambient temperature.

The (e.g. light directing) optical films and optical stacks disclosed herein can be employed in any application that may be desirable to increase brightness, reduce the number of separate components or layers, and reduce the overall thickness. Exemplary applications include televisions, computer monitors, projectors, potable displays such as portable video players, and hand-held devices such as cell-phones. Other exemplary applications include large displays, such as large area televisions, and small displays, such as cell-phone displays. Other exemplary applications include displays for displaying an image or information or general lighting optical systems.

In some embodiments, the optical film stacks include a single light directing (e.g. prism) film designed to increase gain and a non-prismatic microstructured diffuser. In other embodiments, the optical stacks include at least two light directing (e.g. prism) films designed to increase gain. The prism films are typically stacked such that the apices of the first prism film are orthogonal to the apices of the second prism film. In one embodiment, the optical film or optical film stack comprises an optically non-active bonding portion are described for example in WO2011/130155; WO2011/130144; WO2011/130151; and WO 2013/138495.

In one embodiment, the first optical film comprises an optical component having a protrusion such as an optically active structure of a light directing film that has a plurality of unitary discrete structures for directing and/or recycling light. The light optical film can bond to a surface, such as a major surface of a first optical film or glass comprising a primer layer and (e.g. optical) adhesive layer disposed on the primer layer. The unitary discrete structures partially penetrate into the (e.g. optical) adhesive layer with high peel strength. The structures exhibit no or very little change in penetration into the optical adhesive initially and after aging, which can cause a loss in optical properties, such as optical gain or effective optical transmission.

The structures comprise an optically active portion designed primarily to provide optical gain. Various optical films comprising a plurality of structures are known. One favored type of structure is a prism microstructure.

In some embodiments, the entire structure (e.g. structured surface) is optically active. In favored embodiments, at least a portion of the first optical film or structures comprise a bonding portion. The bonding portion penetrates the adhesive layer. In favored embodiments, the optically active portions of the structures do not penetrate the adhesive layer.

Figure 3:
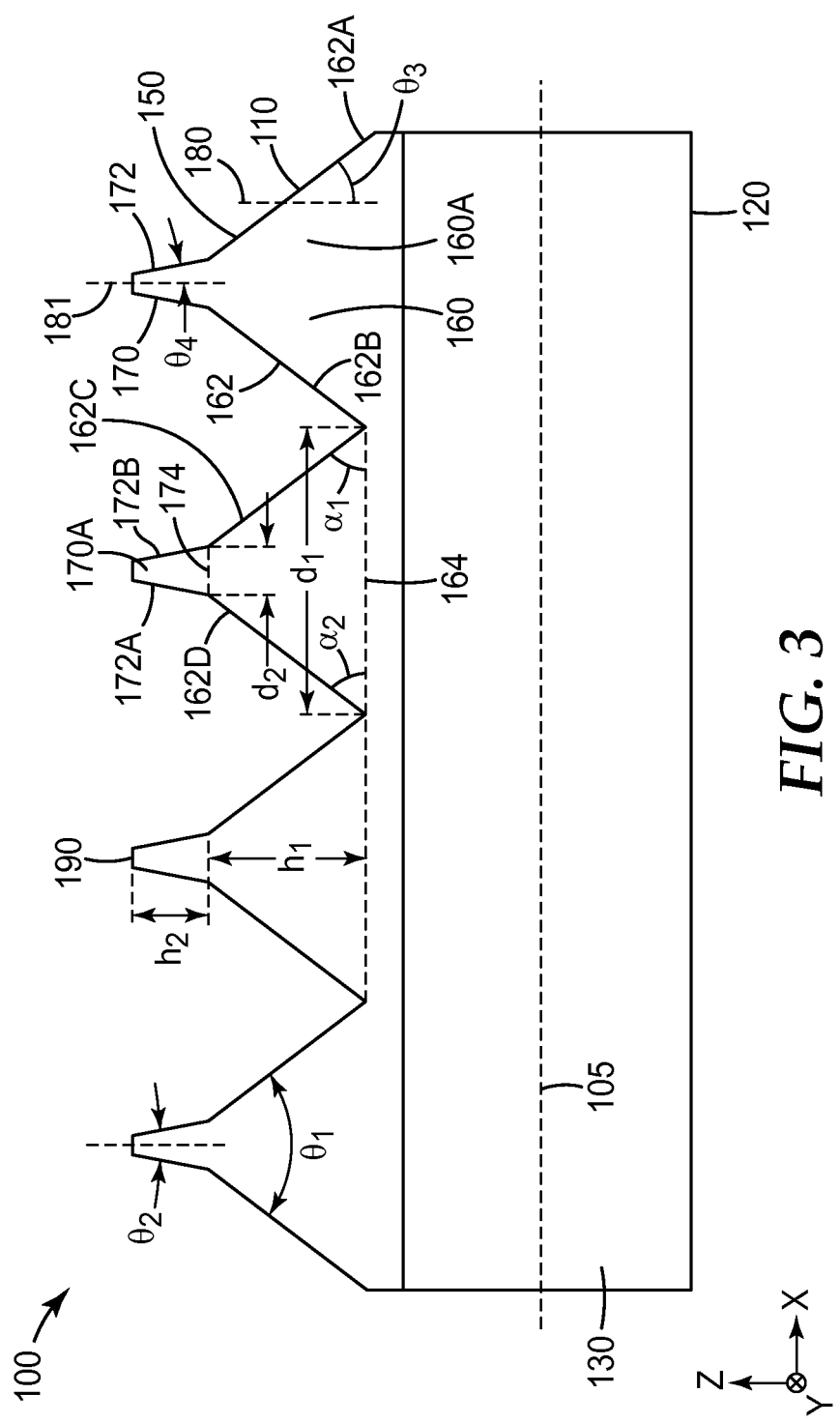
FIG. 3 is a schematic side-view of a light directing film.

FIG. 3 a schematic side-view of a light directing film 100 that includes a first structured major surface 110 and an opposing second major surface 120. First structured major surface 110 includes a plurality of unitary discrete structures 150. Each unitary discrete structure 150 includes an upper portion or bonding portion 170 and a lower portion or light directing portion 160. As used herein, a unitary structure refers to a structure that is a single unit with no interior or internal physical or detectable interfaces between the different portions or segments of the structure. In other words, a unitary structure does not include any interfaces, such as a sharp interface, a gradient interface, or a distributed interface, within the interior of the structure. In some cases, a unitary structure is made of the same material composition meaning that different locations or portions within the structure have the same material composition and the same index of refraction. In some cases, a unitary structure can have a non-uniform material composition or index of refraction distribution. For example, in some cases, a unitary structure can have a gradient refractive index distribution along, for example, the thickness direction of the unitary structure.

For example, each unitary discrete structure 150 includes an upper portion 170 and a lower portion 160 that form a single unit without a physical or detectable interface between the upper and lower portions. In some cases, the upper portions 170 and lower portion 160 can have the same material composition. In such cases, the structure is still considered to be non-unitary if an interface can be detected between the two portions. A unitary structure is typically made or fabricated in a single step, meaning that the process of fabricating the unitary structure cannot reasonably be divided into multiple or separate steps. In some cases, however, a unitary structure can be made or fabricated in two or more steps. A non-unitary or composite structure is typically made in multiple steps.

Unitary discrete structures 150 can have any shape, such as any regular or irregular shape, that may be desirable in an application. For example, in some cases, unitary discrete structures 150 can be or include a three-dimensional rectilinear body, such as a tetrahedron, a prism, or a pyramid, or a portion, or a combination, of such bodies, such as a frustum. In some cases, unitary discrete structures 150 can be or include a three-dimensional curvilinear body, such as a segment of a sphere, an asphere, an ellipsoid, a spheroid, a paraboloid, a cone, or a cylinder. In some cases, at least some of the unitary discrete structures 150 have prismatic profiles.

Unitary structures 150 are discrete, meaning that each unitary structure can be identified individually and as being separate from other similar unitary structures disposed on substrate 130. Each unitary discrete structure 150 includes light directing portion 160 that is primarily designed to direct light. Light directing portion 160 can also be designed to perform other functions, but the primary function of the light directing portion is to redirect light by, for example, refracting or reflecting, such as totally internally reflecting, light.

In general, light directing portion 160 can have any shape, such as any regular or irregular shape, that may be desirable in an application. For example, in some cases, light directing portion 160 can be or include a three-dimensional rectilinear body, such as a tetrahedron, a prism, or a pyramid, or a portion, or a combination, of such bodies, such as a frustum. In some cases, light directing portion 160 can be or include a three-dimensional curvilinear body, such as a segment of a sphere, an asphere, an ellipsoid, a paraboloid, a cone, or a cylinder. In some cases, light directing portions 160 can have a rotationally symmetric bullet-shape structure.

Light directing portion 160 includes a plurality of first side facets 162. For example, in the exemplary light directing film 100, light directing portion 160A includes a first side facet 162A and an opposing first side facet 162B. In general, light directing portion 160 can have two or more side facets.

The light directing portions of the unitary discrete structures disclosed herein are primarily designed to redirect light by, for example, refraction or reflection.

Figure 4:
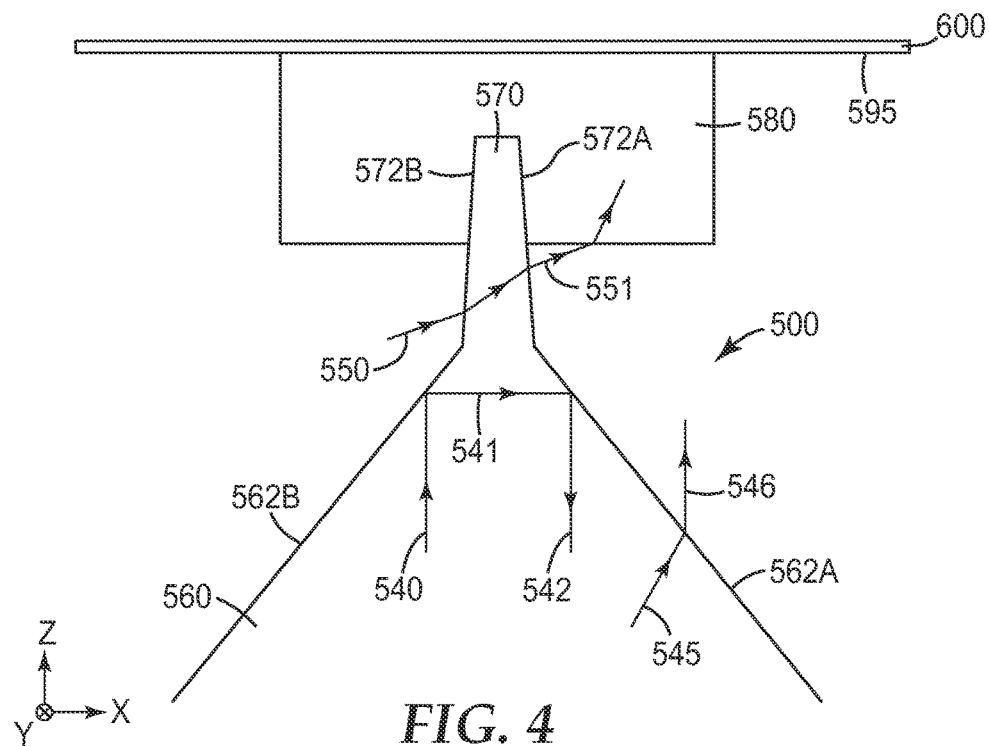
FIG. 4 is a schematic side-view of a unitary discrete structure partially penetrating an optical layer.

For example, FIG. 4 is a schematic side-view of a unitary discrete structure 500 that includes an upper or bonding portion 570 and a lower or light directing portion 560 that includes first side facets 562A and 562B and is primarily designed to direct light. For example, light directing portion 560 directs a light ray 540 as light ray 542 by first totally internally reflecting light ray 540 at side facet 562B as light ray 541 and then totally internally reflecting light ray 541 as light ray 542 at side facet 562A. As another example, light directing portion 560 directs light ray 545 as light ray 546 by refracting light ray 545 at side facet 562A.

Referring back to FIG. 3, each light directing portion 160 of unitary discrete structure 150 of light directing film 100 has a base that is the largest cross-section of the light directing portion that is parallel to the plane of the light directing film and is bound by the side facets of the light directing portion. For example, light directing portion 160 has a base 164 that is the largest cross-section of the light directing portion in a direction parallel to a plane 105 of the light directing film and is bound by side facets 162C and 162D. The exemplary light directing film 100 defines a plane 105 of the light directing film that is in the xy-plane.

Base 164 includes a minimum dimension $d_1$ that, in the exemplary light directing film 100, is along the x-direction. In general, the minimum dimension of the base of a light directing portion can be any value or size that may be desirable in an application. For example, in some cases, the minimum dimension $d_1$ can be less than about 500 microns, or less than about 400 microns, or less than about 350 microns, or less than about 300 microns, or less than about 250 microns, or less than about 200 microns, or less than about 150 microns, or less than about 100 microns, or less than about 90 microns, or less than about 80 microns, or less than about 70 microns, or less than about 60 microns, or less than about 50 microns, or less than about 40 microns, or less than about 30 microns, or less than about 20 microns.

In general, the base of a light directing portion can have any shape, such as any regular or irregular shape, and any size minimum dimension that may be desirable in an application.

In general, a base of a light directing portion can be linear meaning that the dimension, such as the average dimension, of the base along the linear direction of the base is substantially larger than the dimension, such as the average dimension, of the base along the orthogonal direction. For example, in such cases, the ratio of the average dimension of the base along the linear direction to the average dimension of the base along the orthogonal direction is at least about 10, or at least about 50, or at least about 100, or at least about 500, or at least about 1000. In some cases, such as when the ratio of the average dimension of the base along the linear direction to the average dimension of the base along the orthogonal direction is at least about 10,000, the base and the light directing portion and unitary discrete structure associated with the base can be considered to have an infinite or unlimited extent or dimension along the linear direction and a finite or limited extent or dimension along the orthogonal direction. In some cases, the base of a light direction portion can be in the shape of a rectilinear figure, such as a polygon. In some cases, the polygon can be an irregular polygon, such as a rectangle, or a regular polygon, such as an equilateral triangle, a square, a regular hexagon, or a regular octagon. In some cases, the base can be a trapezium, a trapezoid, a parallelogram, a rhombus, or deltoid. In some cases, the base can be in the shape of a curvilinear figure, such as a circle, an ellipse, or a parabola.

Light directing portion 160 has a maximum height $h_1$ which is the maximum dimension or distance between base 164 and bonding portion 170 in a direction that is perpendicular to base 164 or plane 105.

In some cases, each first side facet of a light directing portion makes an angle with the plane of the light directing film that is in a range from about 30 degrees to about 60 degrees. For example, in light directing film 100, side facet 162C makes an angle $\alpha_1$ with plane 105 of the light directing film and side facet 162D makes an angle $\alpha_2$ with plane 105 of the light directing film, where each of $\alpha_1$ and $\alpha_2$ is in a range from about 30 degrees to about 60 degrees. In some cases, each first side facet of a light directing portion makes an angle with the plane of the light directing film that is in a range from about 35 degrees to about 55 degrees, or from about 40 degrees to about 50 degrees, or from about 41 degrees to about 49 degrees, or from about 42 degrees to about 48 degrees, or from about 43 degrees to about 47 degrees, or from about 44 degrees to about 46 degrees. In some cases, each first side facet of a light directing portion makes an angle with the plane of the light directing film that is about 45 degrees. For example, in some cases, each of angles $\alpha_1$ and $\alpha_2$ can be about 45 degrees.

As depicted in FIG. 3, in favored embodiments unitary discrete structure 150 can include bonding portion 170 that is primarily designed to bond the light directing film to a surface. In some cases, bonding portion 170 can also perform, or be designed to perform, other functions, but the primary function of the light directing portion is to bond the light directing film to a neighboring surface via, for example, an adhesive layer. With reference to FIG. 4, bonding portion 570 may be optically non-active or substantially less optically active than the light directing portion 560. Bonding portion 170 is disposed on light directing portion 160. Bonding portion 170 is also disposed on and between side facets 162. For example, bonding portion 170A is disposed on and between side facets 162C and 162D.

In general, bonding portion 170 can have any shape, such as any regular or irregular shape, that may be desirable in an application. For example, in some cases, bonding portion 170 can be or include a three-dimensional rectilinear body, such as a tetrahedron, a prism, or a pyramid, or a portion, or a combination, of such bodies, such as a frustum. In some cases, bonding portion 170 can be or include a three-dimensional curvilinear body, such as a segment of a sphere, an asphere, an ellipsoid, a spheroid, a paraboloid, a cone, or a cylinder.

Bonding portion 170 includes a plurality of side facets 172. For example, in the exemplary light directing film 100, bonding portion 170A includes a side facet 172A and an opposing side facet 172B. In general, bonding portion 170 can have two or more side facets.

The bonding portions of the unitary discrete structures disclosed herein are primarily designed to bond the light directing portions to a neighboring surface. For example, referring to FIG. 4, unitary discrete structure 500 includes bonding portion 570 that includes side facets 572A and 572B and bonds or attaches light directing portion 560 to a neighboring surface 595 of primer layer 600. The primary function of bonding portion 570 is to bond unitary discrete structure 500 or light directing portion 560 to surface 595. In some cases or applications, bonding portion 570 can also direct light. For example, bonding portion 570 can direct a light ray 550 as a light ray 551, but such light directing function is not the primary function of the bonding portion. Rather, the light directing function is a secondary function of the bonding portion.

The bonding portions and light directing portions of the unitary discrete structures disclosed herein have multiple or pluralities of side facets. In general, a side facet disclosed herein can have any shape, such as any regular or irregular shape, that may be desirable in an application. For example, in some cases, a side facet can be or include a planar portion.

Each bonding portion 170 of unitary discrete structure 150 of light directing film 100 has a base that is the largest cross-section of the bonding portion that is parallel to the plane of the light directing film and is bound by the side facets of the bonding portion. Base 174 is bound by side facets 172. For example bonding portion 170 has a base 174 that is the largest cross-section of the bonding portion that is parallel to plane 105 of the light directing film and is bound by side facets 172A and 172B of the bonding portion.

The base of the bonding portion 174 includes a minimum dimension $d_2$ that, in the exemplary light directing film 100, is along the x-direction. In general, a base of a bonding portion can have any shape, such as any regular or irregular shape, and any size minimum dimension that may be desirable in an application. In general, the base of a bonding portion can be linear meaning that the dimension, such as the average dimension, of the base along the linear direction of the base is substantially larger than the dimension, such as the average dimension, of the base along the orthogonal direction. For example, in such cases, the ratio of the average dimension of the base along the linear direction to the average dimension of the base along the orthogonal direction is at least about 10, or at least about 50, or at least about 100, or at least about 500, or at least about 1000. In some cases, such as when the ratio of the average dimension of the base along the linear direction to the average dimension of the base along the orthogonal direction is at least about 10,000, the base, the bonding portion and the unitary discrete structure associated with the base can be considered to have an infinite or unlimited extent or dimension along the linear direction and a finite or limited extent or dimension along the orthogonal direction. In some cases, the base of a bonding portion can be in the shape of a rectilinear figure, such as a polygon. In some cases, the polygon can be an irregular polygon, such as a rectangle, or a regular polygon, such as an equilateral triangle, a square, a regular hexagon, or a regular octagon. In some cases, the base can be a trapezium, a trapezoid, a parallelogram, a rhombus, or deltoid. In some cases, the base can be in the shape of a curvilinear figure, such as a circle, an ellipse, or a parabola.

Referring back to FIG. 3, bonding portion 170 has a maximum height $h_2$ which is the maximum dimension or distance between base 174 and the top of the bonding portion in a direction that is perpendicular to base 174 or plane 105 of the light directing film. In general, the height of the bonding portions disclosed herein can vary along one or more directions. In general, the height of the disclosed linear unitary discrete structures can remain constant or vary along the length of the unitary discrete structures. In some cases, each side facet of a bonding portion makes an angle with the plane of the light directing film that is greater than about 60 degrees. In some cases, each side facet of a bonding portion makes an angle with the plane of the light directing film that is greater than about 65 degrees, or greater than about 70 degrees, or greater than about 75 degrees, or greater than about 80 degrees, or greater than about 85 degrees.

In some cases, each unitary discrete structure in a light directing film disclosed herein includes a plurality of side facets, where the side facets that make an angle with the plane of the light directing film that is in a range from about 35 degrees to about 55 degrees, or from about 40 degrees to about 50 degrees, or from about 41 degrees to about 49 degrees, or from about 42 degrees to about 48 degrees, or from about 43 degrees to about 47 degrees, or from about 44 degrees to about 46 degrees, form or define the light directing portion of the unitary discrete structure, and the side facets that make an angle with the plane of the light directing film that is greater than about 60 degree, or greater than about 65 degrees, or greater than about 70 degrees, or greater than about 75 degrees, or greater than about 80 degrees, or greater than about 85 degrees, form or define the bonding portion of the unitary discrete structure.

In some cases, the minimum dimension of the base of the bonding portion of a unitary discrete structure is substantially less than the minimum dimension of the base of the light directing portion of the unitary discrete structure. For example, referring to FIG. 3, in some cases, the minimum dimension $d_2$ is substantially less than the minimum dimension $d_1$. For example, in such cases, the minimum dimension $d_2$ is less than about 20%, or less than about 18%, or less than about 16%, or less than about 14%, or less than about 12%, or less than about 10%, or less than about 9%, or less than about 8%, or less than about 7%, or less than about 6%, or less than about 5%, or less than about 4%, or less than about 3%, or less than about 2%, or less than about 1%, of the minimum dimension $d_1$.

In some cases, bonding portions 170 have aspect ratios that are greater than 1. For example, in some cases, the ratio of the maximum height $h_2$ of bonding portion 170 to the second minimum dimension $d_2$ of the bonding portion is greater than 1. For example, in such cases, the ratio $h_2/d_2$ is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

In other embodiments, the first optical film comprises a plurality of structures that lack bonding portions. In such embodiment, substantially the entire structure may be optically active.

For example, FIGS. 5A and 5B is a schematic three dimensional view of a light directing film 2100 that includes a plurality of linear prismatic structures 2110 that are disposed on a substrate 2120 and extend linearly along the y-direction.

In another example of a first optical film comprises a plurality of structures that lack bonding portions, FIG. 6 is another schematic three dimensional view of a light directing film 4300 that includes a plurality of linear prismatic structures (e.g. 4320, 4330, 4340). FIG. 6 differs from FIGS. 5A and 5B in that the prismatic structures do not have the same height. Rather a portion of the prisms have a greater height than adjacent prisms. In this embodiments, the apex of the prismatic structures are not coplanar, such as in FIG. 6.

Unitary discrete structures (e.g. 150, 500, 4320) can have any index of refraction that may be desirable in an application. For example, in some cases, the index of refraction of the unitary discrete structures is in a range from about 1.4 to about 1.8, or from about 1.5 to about 1.8, or from about 1.5 to about 1.7. In some cases, the index of refraction of the unitary discrete structures is not less than about 1.5, or not less than about 1.55, or not less than about 1.6, or not less than about 1.65, or not less than about 1.7.

In general, the light directing portions can have multiple side facets. In some cases, such as in the case of linear unitary discrete structures, each light directing portion can include two opposing side facets.

Referring back to FIG. 3, opposing side facets 162 of light directing portions 160 define an included angle $\theta_1$ which is the angle between the two opposing side facets. In some cases, the included angle $\theta_1$ is in a range from about 60 degrees to about 120 degrees, or about 65 degrees to about 115 degrees, or about 70 degrees to about 110 degrees, or about 75 degrees to about 105 degrees, or about 80 degrees to about 100 degrees, or about 85 degrees to about 95 degrees. In some cases, the included angle $\theta_1$ is about 88 degrees, or about 89 degrees, or about 90 degrees, or about 91 degrees, or about 92 degrees.

Side facet 162A of light directing portion 160A makes an angle $\theta_3$ with a normal line 180 that is perpendicular to light directing film 100 or plane 105 of the light directing film. In some cases, the angle $\theta_3$ between a side facet of a light directing portion and the normal to the light directing film is in a range from about 30 degrees to about 60 degrees, or from about 35 degrees to about 55 degrees, or from about 40 degrees to about 50 degrees, or from about 42 degrees to about 48 degrees, or from about 43 degrees to about 47 degrees, or from about 44 degrees to about 46 degrees.

The various angles just described are also applicable to light directing films comprising unitary structures that lack bonding portions, such as FIGS. 5-6.

Opposing side facets 172 of bonding portion 170 define an included angle $\theta_2$ which is the angle between the two opposing side facets. In some cases, the included angle $\theta_2$ between two opposing side facets of a bonding portion is less than about 40 degrees, or less than about 35 degrees, or less than about 30 degrees, or less than about 25 degrees, or less than about 20 degrees, or less than about 15 degrees, or less than about 12 degrees, or less than about 10 degrees, or less than about 9 degrees, or less than about 8 degrees, or less than about 7 degrees, or less than about 6 degrees, or less than about 5 degrees, or less than about 4 degrees, or less than about 3 degrees, or less than about 2 degrees, or less than about 1 degree. In some cases, opposing side facets 172 of bonding portion 170 are parallel to each other. In such cases, the included angle between the two opposing side facets is zero.

Side facets 172 of bonding portions 170 make an angle $\theta_4$ with a normal line 181 that is perpendicular to light directing film 100 or plane 105 of the light directing film. In some cases, the angle $\theta_4$ between a side facet 172 of a bonding portion 170 and a normal 181 to the light directing film 100 is in a range from about zero degree to about 40 degrees, or from about zero degree to about 35 degrees, or from about zero degree to about 30 degrees, or from about zero degree to about 25 degrees, or from about zero degree to about 20 degrees, or from about zero degree to about 15 degrees, or from about zero degree to about 10 degrees, or from about zero degree to about 5 degrees.

In some cases, a side facet of the light directing portion of a unitary discrete structure 150 makes an angle $\theta_3$ with a normal, such as normal 180, to light directing film 100, and a side facet of the bonding portion of the same unitary discrete structure makes an angle $\theta_4$ with the normal, such as normal 180, to light directing film 100. In some cases, $\theta_4$ is less than $\theta_3$. In some cases, $\theta_4$ is less than $\theta_3$ by at least about 5 degrees, or about 10 degrees, or about 15 degrees, or about 20 degrees, or about 25 degrees, or about 30 degrees, or about 35 degrees, or about 40 degrees.

In some cases, the light directing portions of a light directing film can have substantially equal maximum heights. For example, light directing portions 160 can have substantially equal maximum heights $h_1$. In some cases, at least two light directing portions can have unequal maximum heights.

In some cases, the maximum height of a disclosed light directing portion is less than about 500 microns, or less than about 400 microns, or less than about 300 microns, or less than about 200 microns, or less than about 100 microns, or less than about 90 microns, or less than about 80 microns, or less than about 70 microns, or less than about 60 microns, or less than about 50 microns, or less than about 40 microns, or less than about 30 microns, or less than about 20 microns, or less than about 15 microns, or less than about 10 microns.

Referring back to FIG. 3, each bonding portion 170 includes a top surface 190 that connects the plurality of side facets 172 of the bonding portion. In some cases, top surface 190 can be substantially planar. In general, the top surface of a bonding portion can have any shape, such as any regular or irregular shape, or profile that may be desirable in an application. For example, in some cases, the top surface of a bonding portion is substantially piecewise planar.

In some cases, such as when the facets are planar, facets of a bonding portion of a light directing film that make an angle with the plane of the light directing film that is greater that about 60 degrees, or about 65 degrees, or about 70 degrees, or about 75 degrees, or about 80 degrees, or about 85 degrees, form the side facets of the bonding portion and facets of the bonding portion that make an angle with the plane of the light directing film that is less than about 60 degrees, or about 55 degrees, or about 50 degrees, or about 45 degrees, or about 40 degrees, or about 35 degrees, or about 30 degrees, or about 25 degrees, or about 20 degrees, or about 15 degrees, or about 10 degrees, form the top facets of the bonding portion.

In general, the unitary discrete structures in a light directing film may or may not have land portions. In some cases, at least some of the unitary discrete structures in a plurality of unitary discrete structures in a light directing film have symmetric cross-sectional profiles in a direction perpendicular to the light directing film, where by a symmetric unitary discrete structure it is meant that the light directing portion and the bonding portion of the unitary discrete structure have symmetric profiles. For example, a unitary discrete structure is considered to have a symmetric profile if the bonding and light directing portions of the unitary discrete structure have symmetric profiles, even if other parts, such as the land portion, of the unitary discrete structure have asymmetric profiles. In some cases, at least some of the unitary discrete structures in a plurality of unitary discrete structures in a light directing film have asymmetric cross-sectional profiles in a direction perpendicular to the light directing film.

The first optical film is bonded to a substrate (e.g. second optical film) with a light-transmissive adhesive layer, forming an optical stack.

FIGS. 7A and 7B are schematic side-views of an optical stacks 2000 that includes an optical film 2090 that is disposed on a light directing film 2010, where light directing film 2010 can be any light directing film disclosed herein. Light directing film 2010 includes a first structured major surface 2020 and an opposing second major surface 2025. First structured major surface 2020 includes a plurality of unitary discrete structures 2030 that are disposed on a substrate 2005. Each of at least some unitary discrete structures include a light directing portion 2040 primarily for directing light and a bonding portion 2050 primarily for bonding the light directing film to optical film 2090. In some cases, such as in the case of the exemplary optical stack 2000, at least portions of at least some bonding portions 2050 of light directing film 2010 penetrate into optical film 2090 and at least portions of at least some light directing portions 2040 of light directing film 2010 do not penetrate into optical film 2090. In such cases, optical stack 2000 includes a plurality of unfilled voids 2015 between light directing film 2010 and optical film 2090, where the unfilled voids can contain air and/or a gas. In some cases, each of at least some of the plurality of unfilled voids 2015 substantially covers a region that is defined by optical film 2090 and portions of two or more adjacent unitary discrete structures 2030 that do not penetrate into the optical film and immediately surround the region. For example, in such cases, an unfilled void covers at least 50%, or at least 60%, or at least 70%, or at least 80%, or at least 90%, of a region that is defined by optical film 2090 and portions of two or more adjacent unitary discrete structures 2030 that do not penetrate into the optical film. For example, in the case of linear unitary discrete structures 2030, unfilled void 2015 substantially covers the region that is defined on the top by optical film 2090, on the right side by portion 2021 of linear unitary discrete structure 2030A that has not penetrated into the optical film, and on the left side by portion 2022 of linear unitary discrete structure 2030B that has not penetrated into the optical film.

Second optical film 2090 includes an optical layer 2070, primer layer 2075 disposed on optical layer 2070 and optical adhesive layer 2060 disposed on primer layer 2075. The portions of bonding portions 2050 of light directing film 2010 that penetrate into the optical film penetrate into the optical adhesive layer. Optical adhesive layer 2060 attaches or bonds light directing film 2010 to optical layer 2070 or major surface 2071 of optical layer 2070 while substantially maintaining an air environment or surrounding for light directing portions 2040. In some cases, bonding portions 2050 have high aspect ratios which can result in strong bonding between optical film 2090 and light directing film 2010. In some embodiments optical adhesive layer 2060 is directly bonded to primer layer 2075 of optical film 2090. In other embodiments, optical layer 2070 further comprises a microstructured (e.g. diffuser) surface layer 2076 comprising primer layer 2075 as depicted in FIG. 7B.

Bonding portions 2050 that penetrate into optical adhesive layer have an average maximum height $h_{2,avg}$ which is the average of the maximum heights $h_2$ of the individual bonding portions that have penetrated into the optical adhesive layer. In some cases, $h_{2,avg}$ is greater than the average thickness $h_3$ of optical adhesive layer 2060. For example, in such cases, $h_{2,avg}$ is greater than $h_3$ by at least 0.2 microns, or at least 0.3 microns, or at least 0.4 microns, or at least 0.5 microns, or at least 0.7 microns, or at least 1 micron, or at least 1.2 microns, or at least 1.5 microns, or at least 1.7 microns, or at least 2 microns.

When the average heights of the individual bonding portions is greater than the average thickness $h_3$ of the optical adhesive layer, the height of the bonding portions can create a physical separation between the optically active portions of the structures and the adhesive layer. This separation or air interface is maintained or substantially unchanged, provided that the adhesive composition does not flow or "creep" during the normal usage of the stack. Such usage can be simulated by use of aging tests at elevated temperatures, optionally in combination with increased humidity.

Alternatively, when the average heights of the individual bonding portions is less than the average thickness $h_3$ of the optical adhesive layer, the depth of penetration and maintaining such penetration during the normal usage of the stack provides the separation between the optically active portions of the structures and the adhesive layer.

In one embodiment, the optical adhesive layer has an average thickness $h_3$ of about 3 to 6 microns; and the bonding portions have an average maximum height $h_{2,avg}$ of about 4 microns.

In general, a substrate, (e.g. 130, 2005, 2120, 4310), such as optical film substrate 2070, can include any optical layer and provide any function that may be desirable in an application. For example, in some cases, the substrate may primarily provide support for other layers. As another example, the disclosed substrate may polarize light by including, for example, a reflective or absorbing polarizer, diffuse light by including an optical diffuser, direct or redirect light by including a light directing film.

For example, in some cases, optical layer 2070 can be or include an absorbing polarizer. As another example, in some cases, optical film 2090 or optical layer 2070 can include a reflective polarizer. In some cases, the reflective polarizer can include a multilayer optical film wherein at least some of the layers are birefringent. In some cases, the reflective polarizer can include alternating layers, where at least one of the alternating layers includes a birefringent material. In some cases, the reflective polarizer can include a wire grid reflective polarizer, or a cholesteric reflective polarizer. In some cases, the reflective polarizer can be or include a fiber polarizer. In such cases, the reflective polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, the entireties of which are incorporated herein by reference.

As another example, optical layer 2070 can be or include a substrate for providing, for example, support to optical film 2090. For example, substrate 2070 can include a light-transmissive substrate made of glass and/or polymers such as polyethylene terepthalate (PET), polycarbonates, and acrylics. In some cases, the substrate can have multiple layers. In some cases, optical layer 2070 can be a glass layer in a liquid crystal panel.

The preferred thickness of the adhesive layer may vary depending of the composition of substrate 20170. For example, when the substrate comprises a skin layer such as polycarbonate, the thickness of the adhesive layer is preferably 2 to 4 microns greater than the average height of the bonding portion.

In favored embodiments, optical layer 2070 can be or include (e.g. a second) light directing film 2100 that include a plurality of linear prismatic structures, such as FIGS. 5-6. In such cases, unitary discrete structures 2030 of light directing film 2010 can also be linear structures that extend in a direction that is perpendicular to the linear direction of linear prismatic structures 2110. For embodiments wherein optical layer 2070 can be or includes a second light directing film that includes a plurality of linear prismatic structures, the prismatic structures are generally present on surface 2072, i.e. the opposing surface of optical layer 2070 to the adhesive layer 2060. The prisms are typically positioned approximately orthogonal to the prismatic structures of the first optical film. Other relative orientations of the prisms are sometimes desirable.

Figure 8:
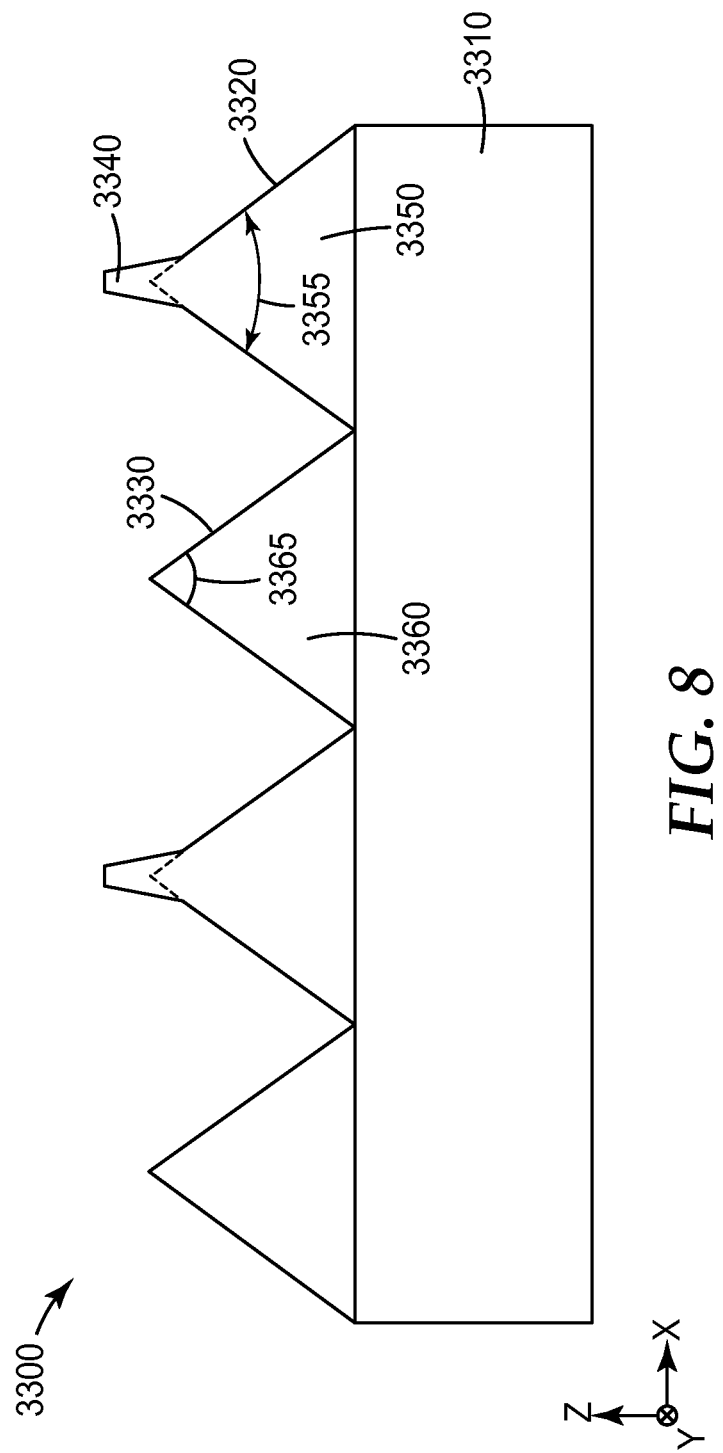
FIG. 8 is a schematic side-view of a light directing film.

In favored embodiments, bonding portions 2050 allow for secure attachment of light directing film 2010 to optical film 2090 or surface 2071 with no or very little loss in optical properties, such as brightness, both initially and after aging. In particular, the bonding portions have sufficiently large aspect ratios to provide sufficient exterior surface to enhance adhesion between the light directing film and the optical film. The bonding portions are also sufficiently narrow relative to the width of the light directing portions so that there is no or very little loss in the effective transmission of the light directing film and/or the optical stack. As used herein, effective transmission (ET), or optical gain, is the ratio of the luminance of an optical system, such as a display system, with the film in place in the optical system to the luminance of the optical system without the film in place. Although FIG. 7 depicts each of the discrete (e.g. prism) structures comprising a bonding portion 2050 such as a post extending from the apex of the (e.g. prism) structures, in other embodiments, some discrete structures in a light directing film can have bonding portions and light directing portions and some other discrete structures may have no bonding portions and may only have light directing portions. For example, FIG. 8 is a side-view schematic of a light directing film 3300 that includes a first plurality of unitary discrete structures 3320 and a second plurality of discrete structures 3330 disposed on a substrate 3310. Unitary discrete structures 3320 includes bonding portions 3340 designed primarily for bonding the light directing film to a surface and light directing portions 3350 designed primarily for directing light and have an included angle 3355. Discrete structures 3330 do not include bonding portions and only include light directing portions 3360 that are prismatic and have an apex angle 3365. In some cases, apex angle 3365 and included angle 3355 can be substantially equal and can, for example, be about 90 degrees. In general, unitary discrete structures can be any unitary discrete structure disclosed herein and discrete structures 3330 can be any discrete structure that is capable of directing light. In some cases, unitary discrete structures 3320 and discrete structures 3330 can be linear structures extending along the same direction, such as, for example, the y-direction. In the exemplary light directing film 3300, the rows of the discrete structures alternate between unitary discrete structures 3320 and discrete structures 3330. In general, each of unitary discrete structures 3320 and discrete structures 3330 can form any pattern or arrangement that may be desirable in an application. For example, discrete structures 3320 and 3330 can form a regular, such as periodic, or an irregular, such as a random, pattern.

Figure 9:
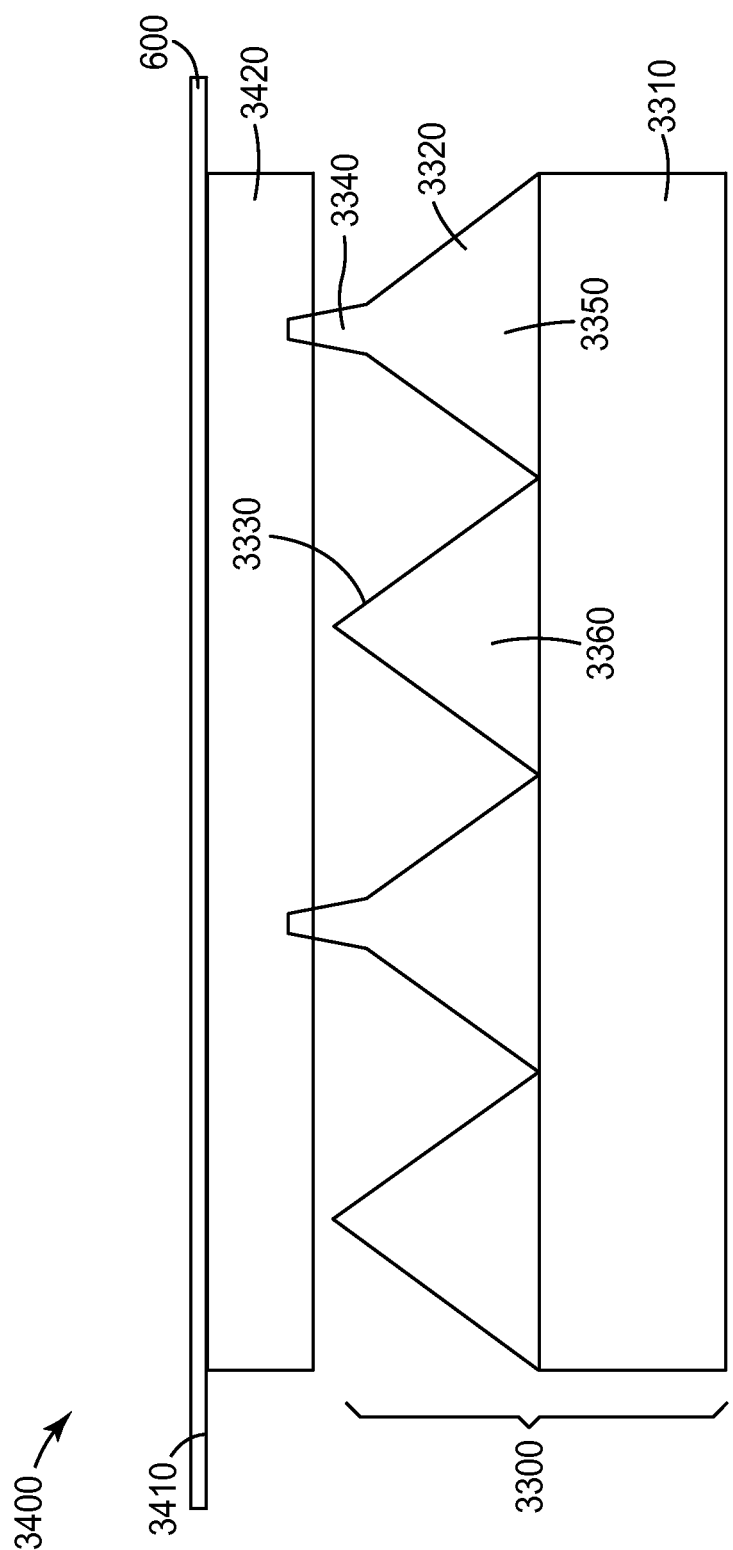
FIG. 9 is a schematic side-view of an optical stack.

FIG. 9 is a schematic side-view of an optical stack 3400 that includes light directing film 3300 laminated to a surface 3410 including primer layer 600 via an optical adhesive layer 3420. Bonding portions 3340 of unitary discrete structures 3320 at least partially penetrate into optical adhesive layer 3420 to provide secure attachment between light directing film 3300 and surface 3410. In the exemplary optical stack 3400, discrete structures 3330 do not penetrate into the optical adhesive layer, although, in some cases, portions of at least some discrete structures 3330 can penetrate into the optical adhesive layer. Light directing film 3300 includes sufficient number of bonding portions 3340 to provide sufficient adhesion between light directing film 3300 and surface 3410. At the same time, the number or density of bonding portions 3340 is sufficiently low so that there is no, or very little, loss in the optical gain or effective transmission of optical stack 3400.

Discrete (e.g. prism) structures wherein only a portion comprise bonding portion are generally favored for obtaining the highest peels in combination with the highest brightness, initially and after aging.

Bonding portions 2050 are designed primarily to provide sufficient adhesion between light directing film 2010 and optical film 2090 by sufficiently penetrating into the optical film. While providing sufficient adhesion between the two films, the bonding portions are sufficiently narrow so as to have no, or very little, effect on the effective transmission of light directing film 2010 or optical stack 2000. For example, in some cases, an optical stack that is similar to optical stack 2000 except that no bonding portion 2050 or unitary discrete structure 2030 penetrates into optical adhesive layer 2060 or optical film 2090, has the same effective transmission or an effective transmission that is only slightly larger than the effective transmission of optical stack 2000. In some cases, the effective transmission of optical stack 2000 prior to aging is not less or is less than by no more than about 20%, or about 15%, or about 10%, or about 9%, or about 8%, or about 7%, or about 6%, or about 5%, or about 4%, or about 3%, or about 2%, or about 1%, as compared to the same optical stack lacking adhesive and bonding portions.

However in other embodiments, the discrete (e.g. prism) structures lack a bonding portion 2050 such as a post extending from the apex of the (e.g. prism) structures. For example, the light redirecting film may comprise solely optically active structures, as depicted in previously described FIGS. 5A, 5B & 6. Although such optical stack constructions typically have lower gain due to portions of the (apex of the) optically active structure rendered optically inactive by being covered with adhesive, such constructions are still improved due to the improved peel strength in combination with high retained brightness or little to no change in structure penetration of the adhesive layer after aging.

In general, the peel strength to separate light redirecting film 2010 comprising optical adhesive layer 2060 from the substrate to which it is bonded, such as optical film 2090 is sufficiently large to provide secure adhesion so that optical stack 2000 can be handled as a single film or unit without bonding portions 2050 delaminating or separating from optical film 2090. In some cases, the initial peel strength (i.e. without aging at conditions of elevated temperature and humidity) of light redirecting film 2010 and optical adhesive layer 2060 is at least 30 g/inch.

The adhesive composition (e.g. of adhesive layer 2060) is selected such that the optical stack has improved adhesion, as measured by the peel strength. The initial peel is at least 50 grams/inch, or about 75 grams/inch, or about 100 grams/inch, and in some embodiments at least about 150 grams/inch, or about 175 grams/inch, or about 200 grams/inch. In some embodiments, the peel strength is no greater than 600, 700, or 800 grams/inch. Peel strengths approaching 1000 grams/inch generally result in tearing of the optical film or bonded substrate.

Additionally, the peel strength of the optical stack falls within the criteria just described after aging. Although, in some embodiments the peel strength may decrease with aging; the optical stack has improved peel strength even with such reduction due in part by the higher initial peel strength.

Figure 10:
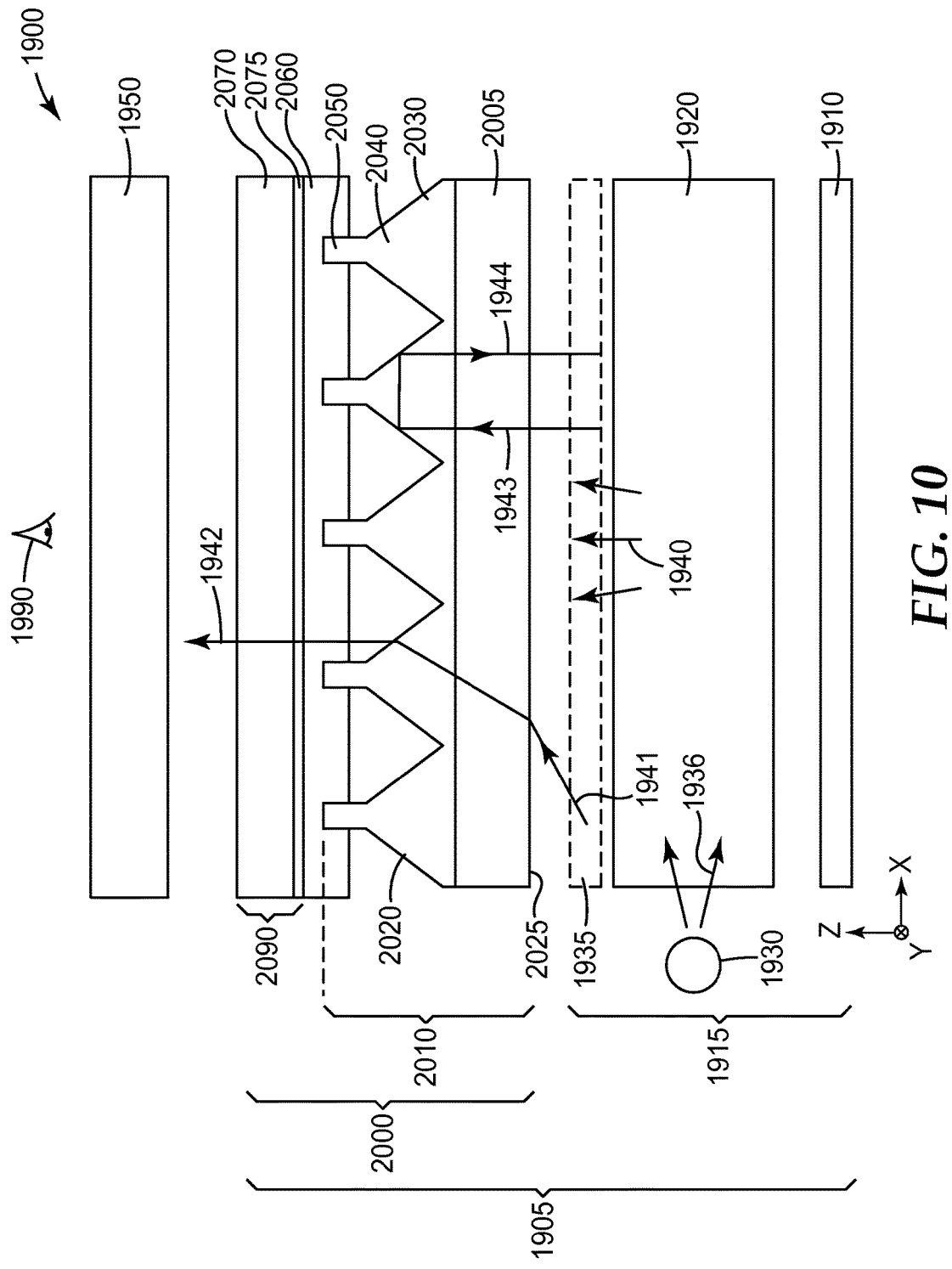
FIG. 10 is a schematic side-view of a display system.

In some cases, a light directing portion of a disclosed unitary discrete structure is designed to recycle light so that, for example, the brightness of an image viewed by a viewer is increased or enhanced. For example, FIG. 10 is a schematic side-view of a display system 1900 that includes an image forming panel 1950 that is capable of forming an image and displaying the image to a viewer 1990 and is disposed to receive light from an illumination system 1905. Illumination system 1905 includes optical stack 2000 disposed on a light source 1915 that includes a lightguide 1920; a lamp 1930 for emitting light 1936 that enters the lightguide, propagates within the lightguide by total internal reflection, and exits the lightguide as light 1940 towards the image forming panel; and a back reflector 1910 for redirecting light that is incident on the back reflector towards the image forming panel. Light directing portions 2040 are designed primarily to either redirect light that exits lightguide 1920 toward image forming panel 1950, or reflect light that exits the lightguide for recycling. For example, light directing portions 2040 redirect light 1941 that exits lightguide 1920 as light 1942 towards the image forming panel or the viewer. As another example, light directing portions 2040 receive light 1943 that exits the lightguide and totally internally reflect back the received light as light 1944 for recycling.

In general, image forming panel 1950 can be any type panel that is capable of forming and image and displaying the image to viewer 1990. In some cases, image forming panel 1950 can be or include a liquid crystal panel. In such cases, a liquid crystal image forming panel 1950 can include a layer of liquid crystal disposed between two panel plates such as glass plates, an upper light absorbing polarizer layer disposed above the liquid crystal layer and a lower absorbing polarizer disposed below the liquid crystal layer. The upper and lower light absorbing polarizers and the liquid crystal layer, in combination, control the transmission of light to viewer 1990. In some cases, image forming panel 1950 can be a monolithic image forming panel or a tiled image forming panel that includes a plurality of image forming tiles. In some cases, light source 1915 can be a monolithic light source or a tiled light source that includes a plurality of light source tiles. In some cases, display system 1900 includes a monolithic image forming panel 1950 and a tiled light source 1915. A tiled light source 1915 can include a plurality of independently controlled tiled lightguides 1920, where each lightguide can illuminate a different zone in a displayed image.

In some cases, display system 1900 or illumination system 1905 can include one or more optional layers 1935 that are disposed between optical stack 2000 and lightguide 1920. Exemplary optional layers 1935 include, light diffusing layers and polarization retardation layers.

In general, the disclosed light directing films include a first structured major surface that include a plurality of unitary discrete structures, and a second major surface that opposes the first structured major surface. In some cases, a disclosed light directing film is designed primarily to receive light from the second major surface side of the light directing film. For example, light directing film 2010 in FIG. 10, is designed primarily to receive light from second major surface 2025 and emit or transmit light from first structured major surface 2020.

Alternatively, a light directing portion of a disclosed unitary discrete structure is designed primarily to redirect, but not recycle, light. In general, the disclosed light directing films include a first structured major surface that include a plurality of unitary discrete structures, and a second major surface that opposes the first structured major surface. In some cases, a disclosed light directing film is designed primarily to receive light from the first structured major surface side of the light directing film.

In some cases, second major surface (for example 120 of FIG. 3) includes a plurality of structures to assist in, for example, diffusing light, hiding or masking defects such as dust particles or scratches, and/or reducing the visibility of an undesirable optical effect such as moiré.

Figure 11:
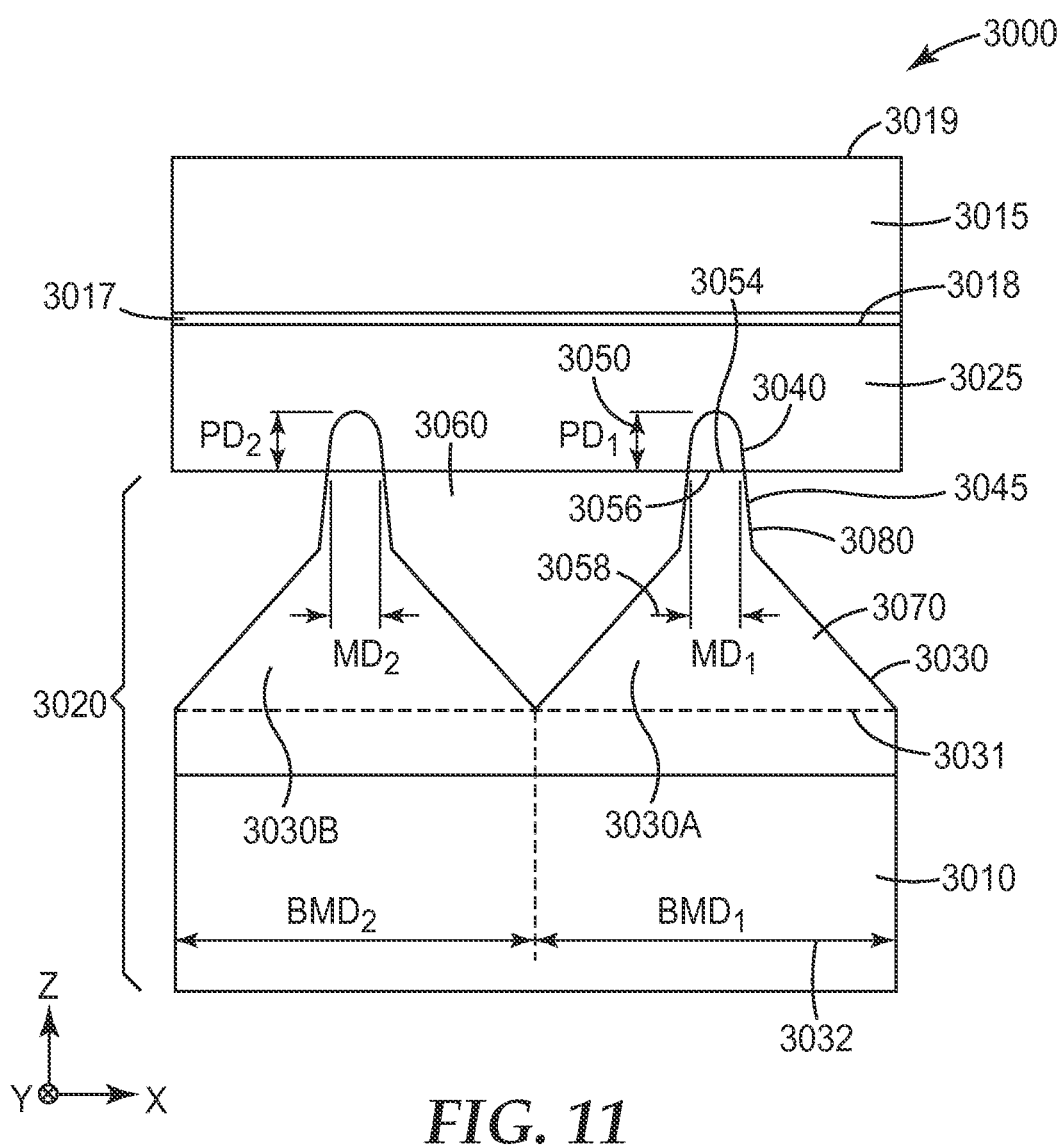
FIG. 11 is a schematic side-view of another optical stack.

FIG. 11 is a schematic side-view of an optical stack 3000 that includes a light directing film 3020 that includes a plurality of unitary discrete structures 3030 disposed on a first substrate 3010, a second substrate 3015 comprising primer layer 3017 having a major surface 3018 facing the light directing film and an opposing major surface 3019 facing away from the light directing film, and an optical adhesive layer 3025 disposed between light directing film 3020 and second substrate 3015 for bonding or adhering the light directing film to surface 3018 of the second substrate.

Portion 3040 of each unitary discrete structure 3030 penetrates into optical adhesive layer 3025 and can be referred to as the penetrating portion 3040 of the unitary discrete structure. Portion 3045 of each unitary discrete structure 3030 does not penetrate into optical adhesive layer 3025 and can be referred to as the non-penetrating portion 3045 of the unitary discrete structure. Each penetrating unitary discrete structure defines a penetration depth 3050 which is the longest penetration distance normal to the optical stack (z-direction). For example, unitary discrete structure 3030A has a penetration depth $PD_1$ and unitary discrete structure 3030B has a penetration depth $PD_2$. Each unitary discrete structure also defines a penetration base 3054 at interface 3056 between penetrating portion 3040 and non-penetrating portion 3045 of the unitary discrete structure. Penetration base 3054 has a minimum penetration base dimension 3058 that, in some cases, can be the width of the penetration base along the x-axis. For example, unitary discrete structure 3030A has a minimum penetration base dimension $MD_1$ and unitary discrete structure 3030B has a minimum penetration base dimension $MD_2$. The plurality of unitary discrete structures 3030 has an average penetration depth and an average minimum penetration base dimension. For example, the unitary discrete structures 3030A and 3030B have an average penetration depth $PD_{avg}$ that is equal to $(PD_1+PD_2)/2$ and an average minimum penetration base dimension $MD_{avg}$ that is equal to $(MD_1+MD_2)/2$. The ratio of the average penetration depth to the average minimum penetration base dimension is sufficiently large so as to provide sufficient adhesion between light directing film 3020 and surface 3018. In some cases, the ratio (i.e. initially and after aging) of the average penetration depth to the average minimum penetration base dimension is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

Each unitary discrete structure 3030 includes a base 3031 that has a minimum base dimension 3032, where base 3031 is also the base of light directing portion 3070. For example, the base of unitary discrete structure 3030A has a minimum base dimension $BMD_1$ and the base of unitary discrete structure 3030B has a minimum base dimension $BMD_2$. The plurality of unitary discrete structures 3030 has an average minimum base dimension. For example, the unitary discrete structures 3030A and 3030B have an average minimum base dimension $BMD_{avg}$ that is equal to $(BMD_1+BMD_2)/2$. The average minimum penetration base dimension $MD_{avg}$ is sufficiently smaller than the average minimum base dimension $BMD_{avg}$ so that there is no, or very little loss, in the effective transmission of optical stack 3000. For example, in some cases, the average minimum penetration base dimension is less than about 20%, or about 15%, or about 10%, or about 9%, or about 8%, or about 7%, or about 6%, or about 5%, or about 4%, or about 3%, or about 2%, or about 1%, of the average minimum base dimension.

The optical stack 3000 includes a plurality of voids 3060 between optical adhesive layer 3025 and light directing film 3020. In some cases, the voids are discrete meaning that each void can be identified individually and as being separate from other voids. In some cases, a discrete void is bound on top by optical adhesive layer 3025, on bottom by light directing film 3020, on one side by the non-penetrating portion of a unitary discrete structure, and on the opposite side by the non-penetrating portion of a neighboring or adjacent unitary discrete structure. The voids are typically filled with air, thereby creating an air interface with the optically active structures (e.g. 3030).

The penetration of penetrating portions 3040 or unitary discrete structures 3030 into optical adhesive layer 3025 results in no, or very little, loss in the effective transmission of optical stack 3000. For example, in such cases, the initial average effective transmission of optical stack 3000 (i.e. without aging at conditions of elevated temperature and humidity) decreases by no more than 10%, or about 9%, or about 8%, or about 7%, or about 6%, or about 5%, or about 4%, or about 3%, or about 2%, or about 1%, as compared to an optical stack that has the same construction except that no unitary discrete structure penetrates into optical adhesive layer 3025.

Each unitary discrete structure 3030 includes a light directing portion 3070 that is designed primarily for directing light and a bonding portion 3080 that is designed primarily for bonding light directing film 3020 to surface 3018 or second substrate 3015. In some cases, at least portions of the bonding portion of each unitary discrete structure penetrates into optical adhesive layer 3025 and at least portions of the light directing portion of each unitary discrete structure does not penetrate into the optical adhesive layer. In some cases, such as when it is desirable to effectively direct light to enhance brightness, only at least portions of bonding portions 3080 penetrate into optical adhesive layer 3025 and no, or very little, portions of light directing portions 3070 penetrate into optical adhesive layer 3025.

Portions of each unitary discrete structure 3030 in the first plurality of unitary discrete structures penetrate into optical layer 3025. Portions of each unitary discrete structure 3030 in the first plurality of unitary discrete structures does not penetrate into optical layer 3025. Each unitary discrete structure (for example, unitary discrete structure 3030A) in the first plurality of unitary discrete structures defines a penetration depth (for example, $PD_1$) and a penetration base (for example, penetration base 3054) at an interface (for example, interface 3056) between the penetrating and non-penetrating portions of the unitary discrete structure. The penetration base has a minimum penetration base dimension (for example, $MD_1$). The first plurality of unitary discrete structures 3030 has an average penetration depth and an average minimum penetration base dimension. The ratio of the average penetration depth to the average minimum penetration base dimension is at least 1.5 and the peel strength between light directing film 3020 and optical layer 3025 is greater than about 50 grams/inch.

All the structures in the first plurality of unitary discrete structures are unitary. Furthermore, only a portion of each structure penetrates into optical layer 3025 resulting in an average penetration depth and an average minimum penetration base dimension. In addition, the ratio of the average penetration depth to the average minimum penetration base dimension is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

In some cases, light directing film 3020 can include a second plurality of unitary discrete structures, where at least one unitary discrete structure in the second plurality of unitary discrete structures does not penetrate into optical layer 3025. For example, some unitary discrete structures in the second plurality of structures may be sufficiently shorter than structures 3030 so that they do not penetrate into optical layer 3025. For example, referring to FIG. 9, the first plurality of unitary discrete structures may include structures 3320 and the second plurality of unitary discrete structures may include structures 3330 that do not penetrate into an optical layer 3420 because they are shorter than structures 3320. In some case, light directing film 3020 can include a second plurality of structures that are composite and not unitary.

Figure 12:
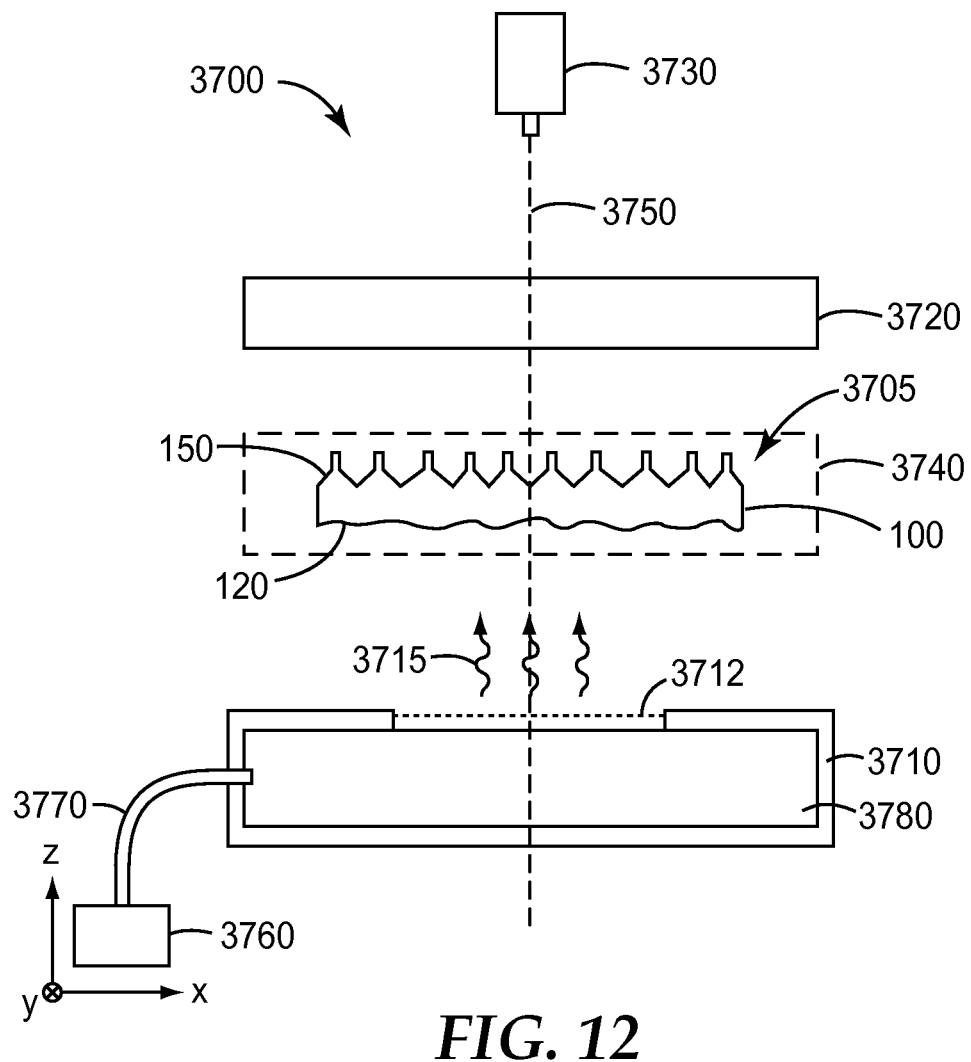
FIG. 12 is a schematic side-view of an optical system suitable for measuring optical gain.

Effective transmission (ET) can be measured using optical system 3700, a schematic side-view of which is shown in FIG. 12. Optical system 3700 is centered on an optical axis 3750 and includes a hollow lambertian light box 3710 that emits a lambertian light 3715 through an emitting or exit surface 3712, a linear light absorbing polarizer 3720 for polarizing light 3715, and a photodetector 3730. Light box 3710 is illuminated by a stabilized broadband light source 3760 that is connected to an interior 3780 of the light box via an optical fiber 3770. A test sample 3705, the ET of which is to be measured by the optical system, is placed at location 3740 between the light box and the absorbing linear polarizer.

Test sample 3705 can be any light directing film or optical stack disclosed herein. For example, test sample 3705 can be light directing film 100 having a plurality of linear unitary discrete structures 150 extending along the y-direction. The ET of light directing film 100 can be measured by placing the light redirecting film in location 3740 with unitary discrete structures 150 facing the photodetector and second major surface 120 facing the light box. Next, the spectrally weighted axial luminance $I_1$ (luminance along optical axis 3750) is measured through the linear absorbing polarizer by the photo detector. Next, light directing film 100 is removed and the spectrally weighted luminance $I_2$ is measured without the light directing film placed at location 3740. ET is the ratio $I_1/I_2$. ET0 is the effective transmission when linear unitary discrete structures 150 extend along a direction that is parallel to the polarizing axis of linear absorbing polarizer 3720, and ET90 is the effective transmission when linear unitary discrete structures 150 extend along a direction that is perpendicular to the polarizing axis of the linear absorbing polarizer. The average effective transmission (ETA) is the average of ET0 and ET90. In some embodiments, the average effective transmission (ETA) of an optical film intermediate or optical film stacks described herein is at least 1.2, 1.4, or 1.6. When the optical stack comprises a first and second optical film, each comprising optically active microstructures designed primarily to provide optical gain, the average effective transmission (ETA) of the optical film stack may be at least 2.10, or 2.15, or 2.20, or 2.25, or 2.35.

Notably, the adhesive composition is selected such that the penetration as well as the average effective transmission (i.e. gain) does not substantially change after aging. The aging conditions may vary. Unless specified otherwise, as used herein, "aging" refers to accelerated environmental aging that is conducted in a test chamber maintained at 65° C. and 95% relative humidity for a period of time of at least 200 hours and in some embodiments, at least 500 hours.

In favored embodiments, the average effective transmission (i.e. gain) exhibits a decrease in optical gain or no greater than 5% when the optical stack is conditioned at 65° C., 95% relative humidity for 200 hours. In some embodiments, the decrease is optical gain is no greater than 4%, 3.5%, 3%, 2.5%, 2%, or 1.5%.

The decrease in gain is related, at least in part, to the change in penetration (PD) with aging. It has been found that a decrease in optical gain of about 8% can result when the penetration changes by as little as 1.8 microns. For embodied microstructures described herein, such change can be a 62% increase in penetration. In some embodiments, there is no change is penetration with aging. In other embodiments, the change in penetration may be 5%, or 10%; yet no greater than 50%. In some embodiments, the change in penetration is no greater than 45%, 40%, 35%, 30%, or 25%.

A decrease in gain can also be caused by the adhesive deforming (e.g. creeping) with aging and thus covering a greater portion of the optically active portion.

Some advantages of the invention are further illustrated by the following examples, but the particular materials and amounts thereof recited in the examples, as well as other conditions and details, should not be construed to unduly limit the invention. All percentages and ratios herein are by weight unless otherwise specified. The particular materials, amounts and dimensions recited in this example, as well as other conditions and details, should not be construed to unduly limit the present invention.

EXAMPLES

The following list of materials is referred to throughout the examples.

TABLE 1

| Component | Supplier | Description | % Solids |
|---|---|---|---|
| Polyacrylate PSA | 3M Company (St. Paul MN) | Terpolymer of isooctyl acrylate (50%), ethyl acrylate (40%), and acrylic acid (10%) having an intrinsic viscosity of 1.9. | 21.2 |

TABLE 1-continued

| Component | Supplier | Description | % Solids |
|---|---|---|---|
| Uvacure 1500 | Cytec Industries (Woodland Park NJ) | Cycloaliphatic Diepoxide | 100 |
| Toluene | Aldrich Chemical (Milwaukee WI) | Solvent | 0 |
| Methanol | Aldrich Chemical (Milwaukee WI) | Solvent | 0 |
| Ethyl Acetate | Aldrich Chemical (Milwaukee WI) | Solvent | 0 |
| 1-Methoxy-2-Propanol | Aldrich Chemical (Milwaukee WI) | Solvent | 0 |
| Diethyl Phthalate | Thirumalai Chemicals (India) | Plasticizer | 100 |
| FP5386 | Hampford Research Inc (Stratford, CT) | Diaryl Iodonium Hexafluoroantimonate Salt, Cationic Photoinitiator | 100 |
| Additol ITX | Cytec Industries (Woodland Park NJ) | Isopropylthioxanthone | 100 |
| Luviskol Plus | BASF (Germany) | Polyvinylcaprolactam homopolymer The polymer is obtained in ethanol at about 40% solids. It has a K value (molecular weight) in the range of 40-46, and glass transition temperature about 155° C. | 40 |
| Luvitec VPC 55K 65W | BASF (Germany) | Copolymer of polyvinylcaprolactam and polyvinylpyrrolidone. It has a number average molecular weight of 125,000 g/mole. | 30 |
| Cymel 327 | Allnex (Belgium) | Melamine formaldehyde resin with a number average molecular weight of 450 g/mole. | 90 |

Optical Films Utilized in the Examples:

Second optical film—Film A was an optical film with two active optical surfaces. Surface A was a prism film made according to the process described in U.S. Pat. No. 5,175,030 and U.S. Pat. No. 5,183,597 using a master tool produced according to the process described in US2009/0041553. The opposing surface (Surface B) was a microstructured diffuser layer prepared from Tool 4, as described in Application Ser. No. 61/885,723, filed Oct. 2, 2013.

Figure 13:
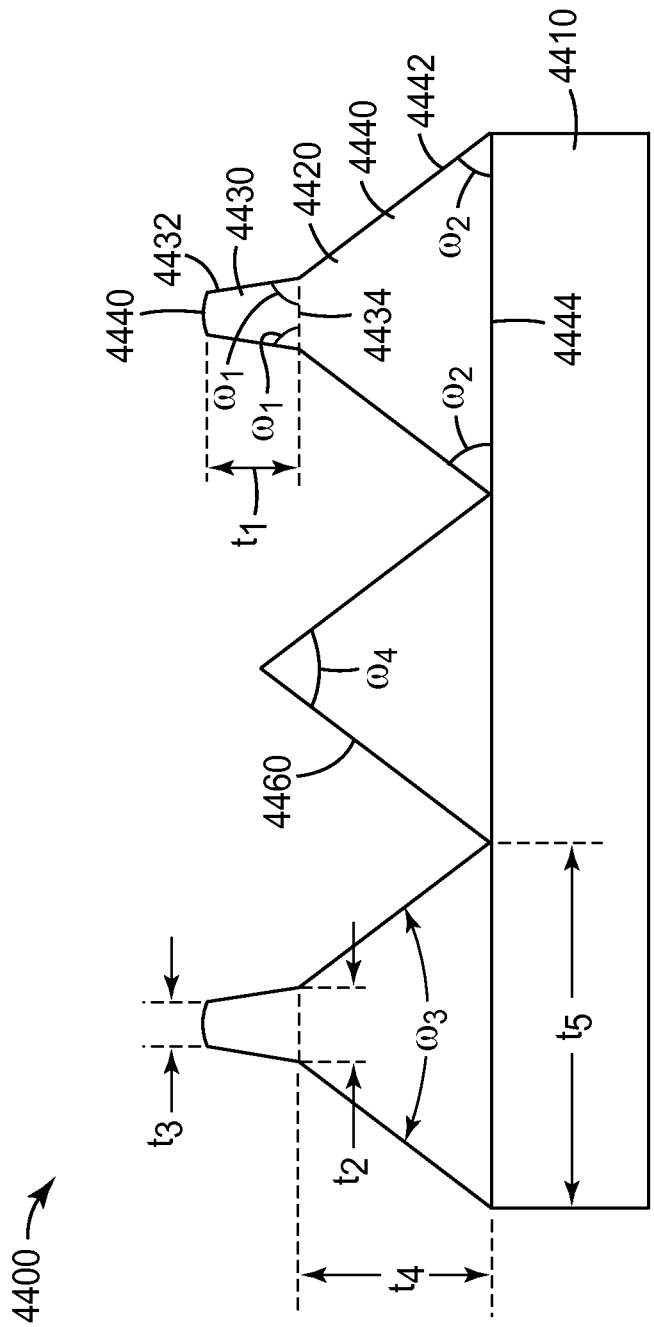
FIG. 13 is a schematic side-view of another optical stack.

First optical film-Film B was a prism film made according to the process described in U.S. Pat. No. 5,175,030 and U.S. Pat. No. 5,183,597. Specifically, Film B is an example of the class of prism films described in US2013/0004728. A representative schematic side-view of Film B is illustrated in FIG. 13. Light directing film 4400 included a first plurality of linear symmetric unitary discrete structures 4420 and a second plurality of linear symmetric discrete structures 4460. Structures 4420 and 4460 extended along the y-direction and were disposed on a substrate 4410. Substrate 4410 was made of PET, had a thickness of about 29 microns and an index of refraction of about 1.65. The cured index of refraction of structures 4420 and 4460 was about 1.56. Each unitary discrete structure included a bonding portion 4430 designed primarily for bonding the light directing film to a surface and disposed on a light directing portion 4440 designed primarily for directing and recycling light. Discrete structures 4460 did not include any bonding portions and were primarily designed to direct and recycle light. Unitary discrete structures 4420 alternated with discrete structures 4460.

Each bonding portion 4430 included two opposing side facets 4432 that made angles $\omega_1$ with the xy-plane (the plane of the light directing film) that were about 80-85 degrees. Each bonding portion had a base 4434, a minimum base dimension t2 that was about 1.5 (±0.5) microns, and a maximum height t1 that was about 4 (±0.5) microns. Each bonding portion also included a curved or rounded top surface that had a minimum top surface dimension t3 of about 0.2 (±0.2) microns. Each light directing portion 4420 included two opposing side facets 4422 that made angles $\omega_2$ with the xy-plane (the plane of the light directing film) that was about 45 degrees. Each light directing portion had a base 4444, a minimum base dimension t5 of about 24 microns, and a maximum height t4 that was about 12 microns. The z-axis offset height difference between the apex of the bonding portion 4430 of unitary discrete structure 4420 and the apex of the apex of discrete structure 4460 was 7 microns. Light directing film 4400 had an average effective transmission ETA of about 1.63.

Preparation of Adhesive Coating Solution A:

A coating solution was prepared by mixing 2,950 g of Polyacrylate PSA, 288 g of Uvacure 1500, 48 g of Diethyl Phthalate, 40 g of FP5386, 1.25 g of Additol ITX, 4,328 g of ethyl acetate, 984 g of methanol, 1,375 g of toluene. This coating solution represents a solvent based adhesive that upon drying may be cured by exposure to actinic radiation to form an interpenetrating network (IPN). The composition of the dried adhesive is summarized in Table 1.

TABLE 1

| Component | Wt-% |
|---|---|
| Polyacrylate PSA | 62.3 |
| Monomer (Uvacure 1500) | 28.8 |
| Diethyl Phthalate | 4.8 |
| Photoinitiator (Uvacure 1600) | 4.0 |
| Sensitizer (Additol ITX) | 0.1 |

Preparation of Primer Coating Solution B:

A coating solution was prepared by mixing 555 g of Polyacrylate PSA, 6.09 g of Luviskol Plus, 1439 g of 1-methoxy-2-propanol. This coating solution represents a solvent based adhesive primer. The composition of the dried primer is summarized in Table 2.

TABLE 2

| Component | Wt-% |
|---|---|
| Polyacrylate PSA | 98.0 |
| Luviskol Plus | 2.0 |

Preparation of Primer Coating Solution C:

A coating solution was prepared by mixing 279 g of Polyacrylate PSA, 4.08 g of Luvitec VPC 55K 65W, 735 g of 1-methoxy-2-propanol. This coating solution represents a solvent based adhesive primer. The composition of the dried primer is summarized in Table 3.

TABLE 3

| Component | Wt-% |
|---|---|
| Polyacrylate PSA | 98.0 |
| Luvitec VPC 55K 65 W | 2.0 |

Preparation of Primer Coating Solution D:

A coating solution was prepared by mixing 1.24 g of Cymel 327, 277 g of RD1241, and 721 g of 1-methoxy-2-propanol. This coating solution represents a solvent based adhesive primer. The composition of the dried primer is summarized in Table 4.

TABLE 4

| Component | Wt-% |
|---|---|
| Polyacrylate PSA | 98.0 |
| Cymel 327 | 2.0 |

Comparative Example 1 (No Primer)

Solution A was coated on Surface B of Film A using a slot-type die at a width of 6 in (15.2 cm) and a web speed of 26 ft/min (7.92 m/min) The solution was delivered using a gear driven pump at a flow rate of 24.5 cc/min. The coated film was dried in a convection oven maintained at a temperature of 150° F. (65.6° C.) and a dew point of 25° F.; the oven length was 30 ft (9.14 m). The nominal thickness of the dried adhesive was 3.3 microns.

Adhesive coated Film A was then conveyed to a lamination station and laminated to the structured side of Film B as in Example 1 such that the apices of the prisms of Film B were orthoganol to the apices of the prisms of Film A.

The initial optical gain and peel force for the laminated optical stack were measured according to the test methods described below. Table 5 summarizes the initial for the laminated optical stack.

Comparative Example 2 (Adhesive Containing Nitrogen-Containing Resin)

Coating solutions A and D were delivered simultaneously using a dual manifold slot type die at a width of 6 in (15.2 cm) and a web speed of 26 ft/min (7.92 m/min) The solutions were delivered using a gear driven pump at a specified flow rate. The coated film was dried in a convection oven maintained at a temperature of 150° F. (65.6° C.) and a dew point of 25° F.; the oven length was 30 ft (9.14 m).

Coating solution D was coated on surface B of substrate Film A. Coating solution A was then coated on solution D. Coating solution D was delivered at a flow rate of 6.65 cc/min. Coating solution A was delivered at a flow rate of 44.5 cc/min. The nominal total thickness of the dried adhesive layers was 3.3 microns.

Adhesive coated Film A was conveyed to a lamination station and laminated to the structured side of Film B such that the apices of the prisms of Film B were orthoganol to the apices of the prisms of Film A. The laminator was configured with a rubber roll (Shore A Durometer of 40) nipped against a steel roll; the nip pressure was maintained at approximately 1.3 lbf/in (2.3 N/cm).

The initial optical gain and peel force for the laminated optical stack were measured according to the test methods described below. Table 5 summarizes the initial for the laminated optical stack.

Example 1

Coating solutions A and B were delivered simultaneously using a dual manifold slot type die at a width of 6 in (15.2 cm) and a web speed of 26 ft/min (7.92 m/min). The solutions were delivered using a gear driven pump at a specified flow rate. The coated film was dried in a convection oven maintained at a temperature of 150° F. (65.6° C.) and a dew point of 25° F.; the oven length was 30 ft (9.14 m).

Coating solution B was coated on surface B of substrate Film A. Coating solution A was then coated on solution B. Coating solution B was delivered at a flow rate of 6.65 cc/min. Coating solution A was delivered at a flow rate of 44.5 cc/min. The nominal total thickness of the dried adhesive layers was 3.3 microns.

Adhesive coated Film A was conveyed to a lamination station and laminated to the structured side of Film B such that the apices of the prisms of Film B were orthoganol to the apices of the prisms of Film A. The laminator was configured with a rubber roll (Shore A Durometer of 40) nipped against a steel roll; the nip pressure was maintained at approximately 1.3 lbf/in (2.3 N/cm).

The initial optical gain and peel force for the laminated optical stack were measured according to the test methods described below. Table 5 summarizes the initial and aged performance for the laminated optical stack.

Example 2

Coating solutions A and C were delivered simultaneously using a dual manifold slot type die at a width of 6 in (15.2 cm) and a web speed of 26 ft/min (7.92 m/min). The solutions were delivered using a gear driven pump at a specified flow rate. The coated film was dried in a convection oven maintained at a temperature of 150° F. (65.6° C.) and a dew point of 25° F.; the oven length was 30 ft (9.14 m).

Coating solution C was coated on surface B of substrate Film A. Coating solution A was then coated on solution C. Coating solution C was delivered at a flow rate of 6.65 cc/min. Coating solution A was delivered at a flow rate of 44.5 cc/min. The nominal total thickness of the dried adhesive layers was 3.3 microns.

Adhesive coated Film A was conveyed to a lamination station and laminated to the structured side of Film B such that the apices of the prisms of Film B were orthoganol to the apices of the prisms of Film A. The laminator was configured with a rubber roll (Shore A Durometer of 40) nipped against a steel roll; the nip pressure was maintained at approximately 1.3 lbf/in (2.3 N/cm).

The initial optical gain and peel force for the laminated optical stack were measured according to the test methods described below. Table 5 summarizes the performance for the laminated optical stack.

Measurement of Optical Gain:

Each film or film laminate was placed on top of a diffusively transmissive hollow light box. The diffuse transmission and reflection of the light box were approximately Lambertian. The light box was a six-sided hollow rectangular solid of dimensions 12.5 cm by 12.5 cm by 11.5 cm made from diffuse PTFE plates about 0.6 mm thick. One face of the box was designated as the sample surface. The hollow light box had a diffuse reflectance of about 0.83% measured at the sample surface averaged over the 400-700 nm wavelength range. During the gain test, the box was illuminated from within through a circular hole about 1 cm in diameter in the surface of the box opposite the sample surface, with the light directed toward the sample surface. The illumination was provided by a stabilized broadband incandescent light source attached to a fiber optic bundle used to direct the light (available as Fostec DCR-III with a one cm diameter fiber bundle extension from Schott North America, Southbridge Mass.). A linear absorbing polarizer (available as Melles Griot 03 FPG 007 from CVI Melles Griot, Albuquerque N.M.) was mounted on a rotary stage (available as ART310-UA-G54-BMS-9DU-HC from Aerotech, Pittsburgh, Pa.) and placed between the sample and the camera. The camera was focused on the sample surface of the light box at a distance of 0.28 m and the absorbing polarizer was placed about 1.3 cm from the camera lens. The luminance of the illuminated light box, measured with the polarizer in place and no sample films in place was greater than 150 cd/m$^2$. The sample luminance was measured with an EPP2000 spectrometer (available from StellarNet Inc, Tampa, Fla.) connected to a collimating lens via a Vis-NIR fiber optic cable (available as F1000-Vis-NIR from StellarNet Inc, Tampa, Fla.); the spectrometer was oriented at normal incidence to the plane of the box sample surface when the sample films were placed on the sample surface. The collimating lens is composed of a lens tube (available as SM1L30 from Thorlabs, Newton, N.J.) and a plano-convex lens (available as LA1131 from Thorlabs, Newton, N.J.); the setup was assembled to achieve a focused spot size of 5 mm at the detector. Optical gain was determined as the ratio of the luminance with the sample film in place to the luminance from the light box with no sample present. For all films, optical gain was determined at polarizer angles of 0, 45 and 90 degrees relative the sample orientation. The average optical gain of the values measured at 0 and 90 degrees is reported.

Measurement of Peel Strength of Optical Stack:

Peel force was measured using an IMASS SP-2000 tester (available from IMASS Inc., Accord Mass.). Test strips 1 inch (2.54 cm) wide and approximately 10 in (25.4 cm) long were cut parallel to the prism orientation of the bottom prism film. Laminate strips were adhered to the tester platform using 1 inch (2.54 cm) wide Scotch double-coated tape (available as Scotch 665 from 3M Company, St. Paul Minn.). The tester was configured to measure the 180 degree peel force. Samples were oriented so that the plano side of the bottom prism film was adhered to the tester platform and the top film was attached to the force balance. The load cell capacity was 10 lbf (44.5 N). Peel force was measured at a rate of 12 in/min (30.5 cm/min) Data were collected after an initial delay of 2 seconds. Measurements were then averaged over a test period of 20 seconds. For each strip sample, a minimum of two sequential 20 second measurements were collected. Data were averaged for 2 strips measured twice each for a total 4 measurements.

TABLE 5

| Example (Laminated Optical Stack) | Unaged Optical Gain | Peel (gr-f/in) |
| --- | --- | --- |
| Comparative 1 | 2.29 | 37 |
| Comparative 2 | 2.27 | 55 |
| 1 | 2.31 | 382 |
| 2 | 2.30 | 331 |

What is claimed is:

1. An article comprising a substrate, a pressure sensitive polyacrylate primer layer disposed on the substrate wherein the pressure sensitive polyacrylate primer layer consists essentially of at least 80% polyacrylate and a nitrogen containing polymer, and an adhesive layer disposed onto the primer layer; wherein the adhesive layer comprises a polyacrylate component.

2. The article of claim 1 wherein the adhesive layer is further bonded to a second substrate or a release liner.

3. The article of claim 1 wherein at least one substrate further comprises a microstructured surface layer and the primer layer is bonded to the microstructured surface layer.

4. The article of claim 3 wherein the microstructured surface layer comprises a plurality of peaks and the peaks are free of matte particles.

5. The article of claim 1 wherein the substrate is an optical substrate.

6. The article of claim 1 wherein the adhesive layer comprises a cured adhesive layer comprising an interpenetrating network of the reaction product of the polyacrylate and a polymerizable monomer.

7. The article of claim 6 wherein the cured adhesive layer has an elastic modulus ranging from 100 to 2000 MPa at 25 C.

8. The article of claim 6 wherein the polymerizable monomer of the adhesive layer comprises a monomer comprising functional groups and a molecular weight less than 150 g/mole per functional group.

9. The article of claim 8 wherein the polymerizable monomer of the cured adhesive layer is a cationically polymerizable epoxy resin or a free-radically polymerizable monomer.

10. The article of claim 6 wherein the cured adhesive layer comprises about 35 wt-% to about 75 wt-% of the polyacrylate.

11. The article of claim 6 wherein the cured adhesive layer is free of a nitrogen-containing monomer or polymer.

12. The article of claim 1 wherein the primer layer comprises at least 85 wt-% of the polyacrylate.

13. The article claim 1 wherein the polyacrylate of the adhesive is a pressure sensitive adhesive.

14. The article of claim 1 wherein the polyacrylate of the primer, adhesive, or combination thereof comprises at least 40 wt-% of monomeric repeat units comprising branched C4-C12 alkyl groups.

15. The article of claim 1 wherein the nitrogen-containing polymer of the pressure sensitive polyacrylate primer layer comprises at least one nitrogen atom comprising a free pair of electrons.

16. The article of claim 15 wherein the primer layer comprises up to 5 wt-% of one or more nitrogen-containing polymers.

17. The article of claim 16 wherein the nitrogen-containing polymer is a homopolymer or copolymer of vinylcaprolactam, vinylpyrollidone, or a combination thereof.

18. An film stack comprising a first film comprising
- a pressure sensitive polyacrylate primer layer disposed on the first optical film wherein
- the pressure sensitive polyacrylate primer layer consists essentially of at least 80% polyacrylate and a nitrogen containing polymer, and
- an adhesive layer disposed onto the primer layer; wherein the adhesive layer comprises a polyacrylate component; and a second film bonded to the adhesive layer.

19. The film stack of claim 18 wherein the first film comprises a plurality of structures on a first surface bonded to a second film such that a portion of the structures penetrate a major surface of the adhesive layer and a separation is provided between the major surface of the adhesive layer and the first surface.

20. The film stack of claim 19 wherein less than 50% of the total surface area of the major surface of the adhesive layer is in contact with the structures.

\* \* \* \* \*

UNITED STATES PATENT AND TRADEMARK OFFICE
CERTIFICATE OF CORRECTION

| | | |
|---|---|---|
| PATENT NO. | : 9,850,405 B2 | Page 1 of 2 |
| APPLICATION NO. | : 15/022217 | |
| DATED | : December 26, 2017 | |
| INVENTOR(S) | : William Edmonds | |

It is certified that error appears in the above-identified patent and that said Letters Patent is hereby corrected as shown below:

In the Specification

Column 2
Line 63, After "reference" insert -- . --.

Column 5
Line 51, Delete "isobomyl" and insert -- isobornyl --, therefor.
Line 60-61, Delete "1,3-propane diol," and insert -- 1,3-propanediol, --, therefor.

Column 21
Line 50, Delete "terepthalate" and insert -- terephthalate --, therefor.

Column 31
Line 40, Delete "(7.92 m/min)" and insert -- (7.92 m/min). --, therefor.
Line 49, Delete "orthoganol" and insert -- orthogonal --, therefor.
Line 60, Delete "(7.92 m/min)" and insert -- (7.92 m/min). --, therefor.

Column 32
Line 7, Delete "orthoganol" and insert -- orthogonal --, therefor.
Line 35, Delete "orthoganol" and insert -- orthogonal --, therefor.
Line 63, Delete "orthoganol" and insert -- orthogonal --, therefor.

Column 33
Line 64, Delete "(30.5 cm/min)" and insert -- (30.5 cm/min). --, therefor.

In the Claims

Column 34
Line 38-39, In Claim 7, delete "25 C." and insert -- 25° C. --, therefor.
Line 55, In Claim 13, after "article" insert -- of --, therefor.

Signed and Sealed this
Twenty-second Day of October, 2019

Andrei Iancu
*Director of the United States Patent and Trademark Office*

Column 35
Line 3, In Claim 17, delete "vinylpyrollidone," and insert -- vinylpyrrolidone, --, therefor.